(12) United States Patent
Suganuma et al.

(10) Patent No.: US 7,121,945 B2
(45) Date of Patent: Oct. 17, 2006

(54) COMBINED REPRESENTATION DISPLAY METHOD

(75) Inventors: Masanori Suganuma, Tokyo (JP); Hayato Mizue, Tokyo (JP)

(73) Assignee: Konami Corporation, Tokyo (JP)

( * ) Notice: Subject to any disclaimer, the term of this patent is extended or adjusted under 35 U.S.C. 154(b) by 638 days.

(21) Appl. No.: 10/137,978

(22) Filed: May 3, 2002

(65) Prior Publication Data

US 2003/0130034 A1 Jul. 10, 2003

(30) Foreign Application Priority Data

Jan. 7, 2002 (JP) .............................. 2002-000561

(51) Int. Cl.
*A63F 13/00* (2006.01)

(52) U.S. Cl. ........................................ 463/34
(58) Field of Classification Search ............. 463/1, 463/5, 10, 16–20, 31–34
See application file for complete search history.

(56) References Cited

U.S. PATENT DOCUMENTS

| 5,096,195 | A |   | 3/1992  | Gimmon                       |
|-----------|---|---|---------|------------------------------|
| 5,190,286 | A |   | 3/1993  | Watanabe et al.              |
| 5,669,685 | A |   | 9/1997  | Kotani et al.                |
| 5,788,573 | A | * | 8/1998  | Baerlocher et al. ..... 463/16 |
| 6,142,875 | A | * | 11/2000 | Kodachi et al. ......... 463/20 |
| 6,164,645 | A |   | 12/2000 | Weiss                        |
| 6,186,894 | B1|   | 2/2001  | Mayeroff                     |
| 6,280,323 | B1| * | 8/2001  | Yamazaki et al. ......... 463/4 |
| 6,287,194 | B1| * | 9/2001  | Okada et al. ........... 463/16 |
| 6,315,666 | B1|   | 11/2001 | Mastera et al.               |
| 6,517,437 | B1| * | 2/2003  | Wells et al. ............ 463/30 |
| 6,599,192 | B1| * | 7/2003  | Baerlocher et al. ..... 463/220 |
| 6,620,044 | B1| * | 9/2003  | Okada .................. 463/20 |
| 6,638,165 | B1| * | 10/2003 | Uchiyama et al. ........ 463/20 |

FOREIGN PATENT DOCUMENTS

| JP | 07-136345   | 5/1995  |
|----|-------------|---------|
| JP | 07-313661   | 12/1995 |
| JP | 08.309023   | 11/1996 |
| JP | 08-323037   | 12/1996 |
| JP | 11-114221   | 4/1999  |
| JP | 11-151352   | 6/1999  |
| JP | 2000-300750 | 10/2000 |
| JP | 2001-017680 | 1/2001  |
| JP | 2001-087452 | 4/2001  |
| JP | 2001-218930 | 8/2001  |
| JP | 2001-286630 | 10/2001 |

\* cited by examiner

*Primary Examiner*—Mark Sager
*Assistant Examiner*—Robert E. Mosser
(74) *Attorney, Agent, or Firm*—Welsh & Katz, Ltd.

(57) ABSTRACT

A combined representation display method is provided in which a main display and a representation display are combined whereby various combination displays with enormous representation effects and great funs are made possible.

The combined representation display method according to the invention is a combined representation display method for a display screen 1G which has a main display section 25e1 and a representation display section 25e, and the representation display section 25e shows combined representation in combination with main displays 26*an*, 26*bn*, 26*cn* of the main display section 25e1.

1 Claim, 15 Drawing Sheets

  
 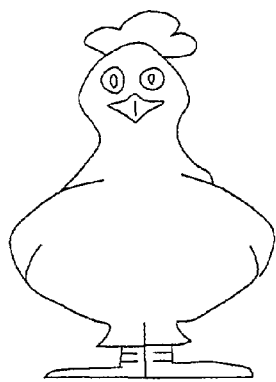 
FIG.15(a)  FIG.15(b)  FIG.15(c)

COMBINED REPRESENTATION DISPLAY METHOD

BACKGROUND OF THE INVENTION

1. Field of the Invention

The present invention relates to a combined representation display method which links a main display section with a production display section on a display screen.

2. Description of the Related Art

Among conventional game machines having an image display device employing virtual images, there is a target hitting game machine which is disclosed in Japanese Patent Application Laid-Open No. 8-323037.

The target hitting game machine shows a target image, which is shown on a CRT (Cathode-Ray Tube) display, to the player by superimposing a virtual image on a hitting stand with a mirror image of a hammer held by the player by means of a half mirror.

To play the game, the player proceeds the game while watching the screen of the image display device, swings down the hammer to hit the hitting stand in such a way that the mirror image hammer hits the target images.

When the player hits a target image, an impact sensor detects the hitting action and outputs a signal. According to the output signal, an image control device changes the target image on the CRT display to a hit effect image.

There are also a superimposed image display device, a game device and a bowling game device as disclosed in Japanese Patent Application Laid-Open No. 11-114221.

The above superimposed image display device superimposes an actual ball and an image ball to show to an observer and has a CRT display for showing an image and a mirror for forming a reflected virtual image of the image.

To play the game, the real ball released by the player rolls along a moving surface to pass through the mirror to reach the back of it.

And, when the real ball passes through the half mirror section of the mirror, the image ball having the same external shape as the real ball appears. Thus, the real ball is replaced by the image ball.

Specifically, after the real ball disappears behind the mirror, the image ball continues moving as a reflected virtual image.

The amusement machine disclosed in Japanese Patent Application Laid-Open No. 11-104311 has a variable display device which is comprised of spinning drums which have special designs formed on their peripheries, drum lamps which can irradiate light to the special designs of the spinning drums, a half mirror which allows visible permeation of the special designs by lighting from the drum lamps, and a projection display mechanism which can project an image to be projected to show it on the half mirror. The projection display mechanism projects character designs to show them as projection images on the half mirror.

By configuring as described above, a mechanical variable display device which can display the character designs in addition to the display of the special designs is provided, and a decorative visual effect is improved.

As described above, the image display device of the target hitting game machine disclosed in Japanese Patent Application Laid-Open No. 8-323037 is a game which is played based on the virtual hammer image and its background image using the half mirror. It is a game showing as an image created on the basis of an actual mole hitting game machine which is generally seen here and there. It simply shows a virtual image and is not configured to make a combination display.

According to the superimposed image display device, the game device and the bowling game device disclosed in Japanese Patent Application Laid-Open No. 11-114221, when the real ball released by the player disappears behind the mirror, the image ball as the reflected virtual image continues its movement. It has effects of decreasing a space occupied by the game machine and simplifying the device by separately disposing the spatially actual portion and the reflected virtual image portion but is poor in changes and variations of the display because it simply shows the virtual images.

In the amusement machine disclosed in Japanese Patent Application Laid-Open No. 11-104311, the player visually recognizes the special designs of the spinning drums through the half mirror. The projection image is projected onto and shown on the half mirror by superimposing on the special designs on the spinning drums, but the display to the player is mainly based on the special designs on the spinning drums. It is just an addition of the image expression of the virtual images to the peripheries of the special designs on the spinning drums. Thus, it is not particularly described about the combination display of the operations of the spinning drums with the image expression

SUMMARY OF THE INVENTION

In view of the circumstances described above, it is an object of the present invention to provide a combined representation display method in which a main display and a representation display are combined whereby various combination displays with enormous representation effects and great funs are made possible.

The combined representation display method according to claim 1 of the present invention is a combined representation display method for a display screen having a main display section and a representation display section, wherein the representation display section shows combined representation in combination with a main display by the main display section.

By configuring as described above, the representation display section shows the combined representation in combination with the main display of the main display section, so that the main display of the main display section is represented, and it is possible to add new fun.

The combined representation display method according to claim 2 of the invention is directed to the combined representation display method according to claim 1, wherein the main display section shows a slot game which is shown on peripheries of a plurality of design reels having designs; and the representation display section shows in combination with the operation of the design reels.

By configuring as described above, the display by the representation display section is performed in combination with the operation of the design reels. Therefore, it is felt that the operations of the design reels is performed in combination with the display by the representation display section, and it is possible to add representation, which has a game property and a story, to the operations of the design reels.

The combined representation display method according to claim 3 of the invention is directed to the combined representation display method according to claim 1 or 2, wherein the main display section shows a slot game which is shown on peripheries of a plurality of design reels having designs;

and when a winning hand is realized, payoff gained by the realization of winning hand is shown on the representation display section.

By configuring as described above, when the winning hand is realized, the gained payoff for the realization of winning hand is shown by the representation display section, so that the player can know the gained payoff without moving his or her eyes.

The combined representation display method according to claim 4 of the invention is directed to the combined representation display method according to claim 2, wherein when a bonus game is realized, at least either the main display section or the representation display section moves on the display screen.

By configuring as described above, when the bonus game is realized, at least one of the main display section or the representation display section is moved on the display screen, so that it is possible to make new representation in the representation display section in the bonus game.

The combined representation display method according to claim 5 of the invention is directed to the combined representation display method according to claim 1, wherein: the main display section shows a slot game which is shown on peripheries of a plurality of design reels having designs; the representation display section shows a plurality of characters; a first character simultaneously starts a first action in combination with the start of spinning of the design reels; after all the design reels are spun, the first character performs the first action as the design reels stop spinning one by one; and a second character simultaneously performs a second action in combination with the stop of spinning of the last spinning design reel.

By configuring as described above, the design reels are started to spin by the first action of the first character, the stop of the last spinning design reel is visually recognized as the result of the second action of the second character, and the representation effect can be added to the operation of the design reels.

The combined representation display method according to claim 6 is directed to the combined representation display method according to claim 5, wherein: when a winning hand is realized, the second character performs a third action; and when the winning hand is not realized, the second character performs a fourth action.

By configuring as described above, the joy of the realization of winning hand can be elevated by the third action of the second character, and when the winning hand is not realized, an event caused by the fourth action of the second character can be expressed exaggeratedly.

The combined representation display method according to claim 7 is directed to the combined representation display method according to claim 5 or 6, wherein: when the winning hand is realized, payoff gained by the realization of winning hand is shown on the representation display section.

By configuring as described above, when the winning hand is realized, the gained payoff for the realization of winning hand is shown by the representation display section, so that the player can know the gained payoff without moving his or her eyes.

The combined representation display method according to claim 8 is directed to the combined representation display method according to claim 5 or 6, wherein: along with the realization of a bonus game, the main display section is changed from one side to the other side, and the representation display section is changed from the other side to one side.

By configuring as described above, according to the realization of the bonus game, the main display section is changed from one side to the other side, and the representation display section is changed from the other side to one side, so that new representation of the representation display section becomes possible in the bonus game.

The combined representation display method according to claim 9 of the invention is directed to the combined representation display method according to claim 8, wherein: when the bonus game is realized, after all the design reels are spun and stopped spinning one by one, the second character performs a fifth action and the last spinning design reel is stopped.

By configuring as described above, the last spinning design reel is stopped by the fifth action of the second character, so that the representation effect can be added to the determination of the combination of the designs.

The combined representation display method according to claim 10 of the invention is directed to the combined representation display method according to claim 1, wherein the main display section shows a slot game which is shown on peripheries of a plurality of design reels having designs; the representation display section shows a plurality of characters; and at least one of the spinning design reels stops spinning in combination with prescribed motions of the respective characters.

By configuring as described above, at least one of the spinning design reels is stopped in combination with a prescribed action of the respective characters, so that it is visually recognized that the design reels are stopped in combination with the prescribed motions of the characters, and the representation effect can be added to the stop of the design reels.

The combined representation display method according to claim 11 of the invention is directed to the combined representation display method according to claim 10, wherein after the respective characters perform the prescribed motions, display modes of the respective characters are changed.

By configuring as described above, the display modes of the characters are changed after the prescribed motions of the respective characters, so that the story can be added to the representation of the slot game.

The combined representation display method according to claim 12 of the invention is directed to the combined representation display method according to claim 11, wherein after a winning hand is realized, the display modes of the respective characters are changed to original display modes.

By configuring as described above, after the realization of winning hand, the display modes of the respective characters are changed to the original display modes, so that the representation can be made like a single story from the start of the game to the realization of the winning hand.

The combined representation display method according to claim 13 of the invention is directed to the combined representation display method according to any one of claims 10 to 12, wherein when a winning hand is realized, the characters perform a sixth action, and payoff gained by the realization of winning hand is shown on the representation display section.

By configuring as described above, after the winning hand is realized, the characters perform the sixth action, the realized winning hand owing to the realization of winning hand is shown on the representation display section, so that joy of the realization of winning hand is doubled by the sixth action of the characters, and the player can know the gained payoff without moving his or her eyes.

BRIEF DESCRIPTION OF THE DRAWINGS

FIGS. 15(a), 1 5(b) and 15(c) are diagrams showing a state that a chicken becomes fat after pecking in the chicken game of the second embodiment of the invention.

DESCRIPTION OF THE PREFERRED EMBODIMENTS

The present invention will be described in detail with reference to the accompanying drawings which show the embodiments of the invention.

Figure 1:
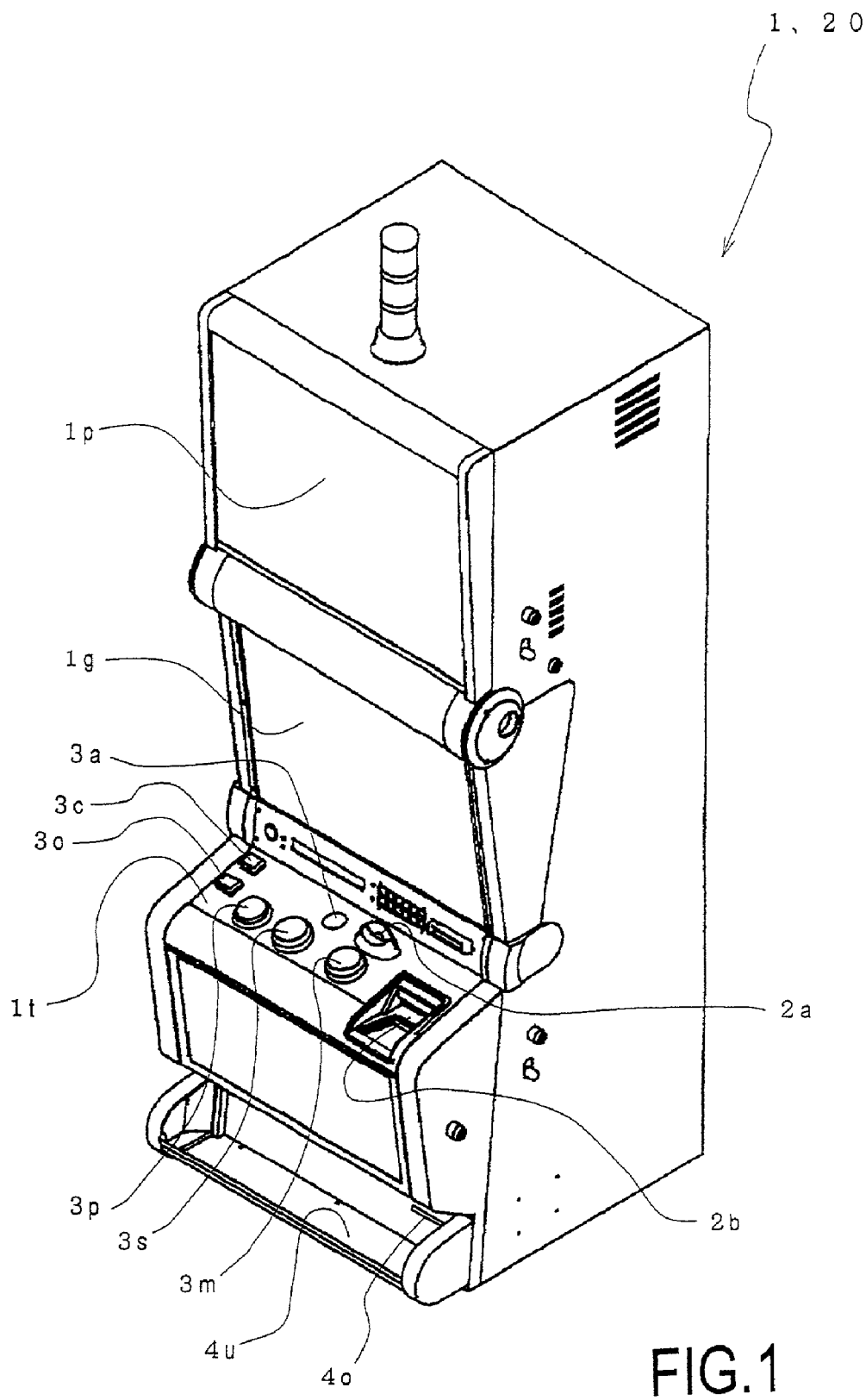
FIG. 1 is a perspective diagram showing an appearance of a slot game machine which can display virtual images and images, to which an embodiment of the combined representation display method according to the present invention is applied and an appearance of a slot game machine having an image display only.
Figure 2:
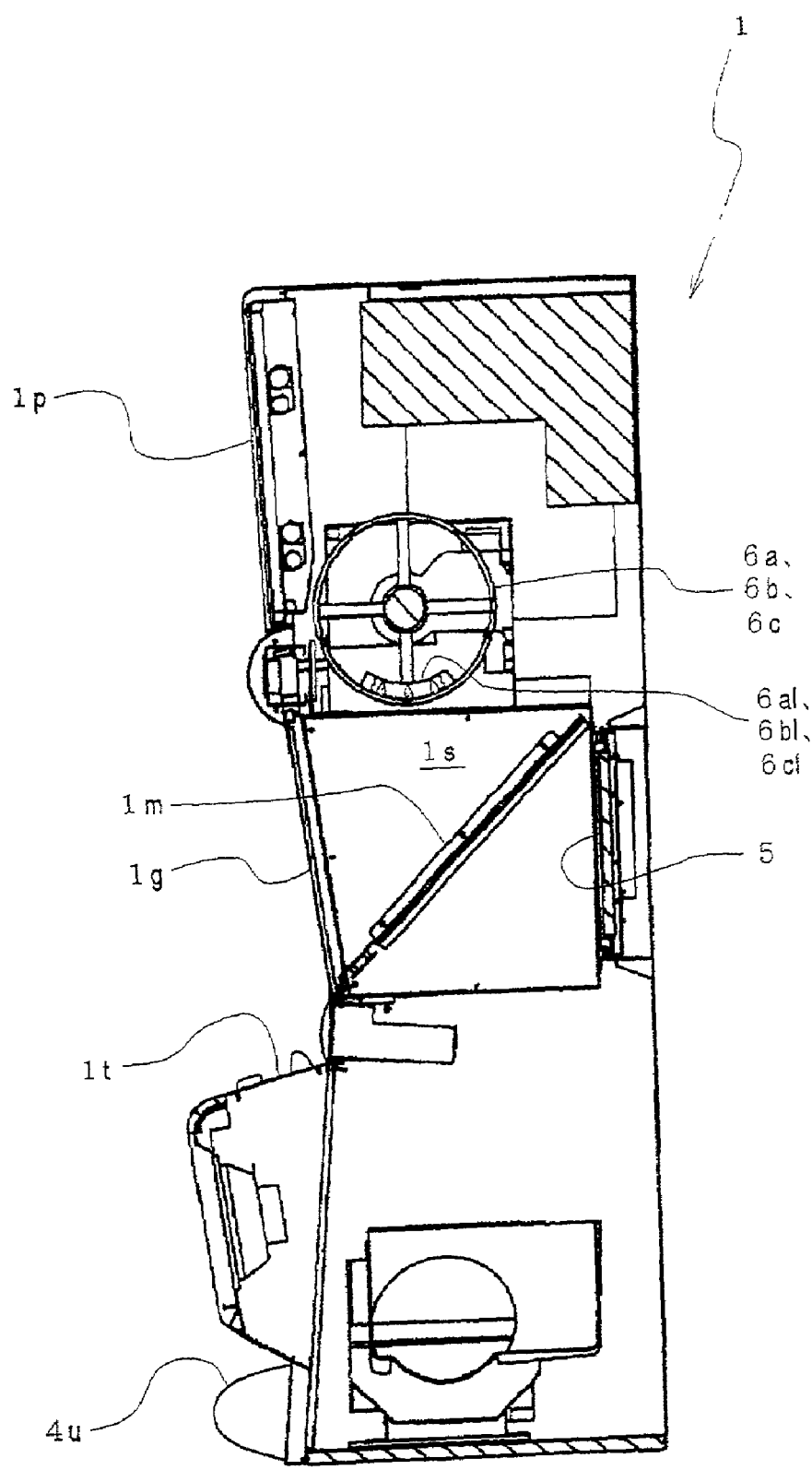
FIG. 2 is a vertical sectional diagram showing the essential portion viewed from one side of the slot game machine of FIG. 1 which can display virtual images and images.

FIG. 1 is a perspective diagram showing an appearance of a slot game machine 1 which can display virtual images and images to which the invention is applied and an appearance of a slot game machine 20 having an image display only, and FIG. 2 is a vertical sectional diagram of the slot game machine 1 viewed from its side.

Figure 3:
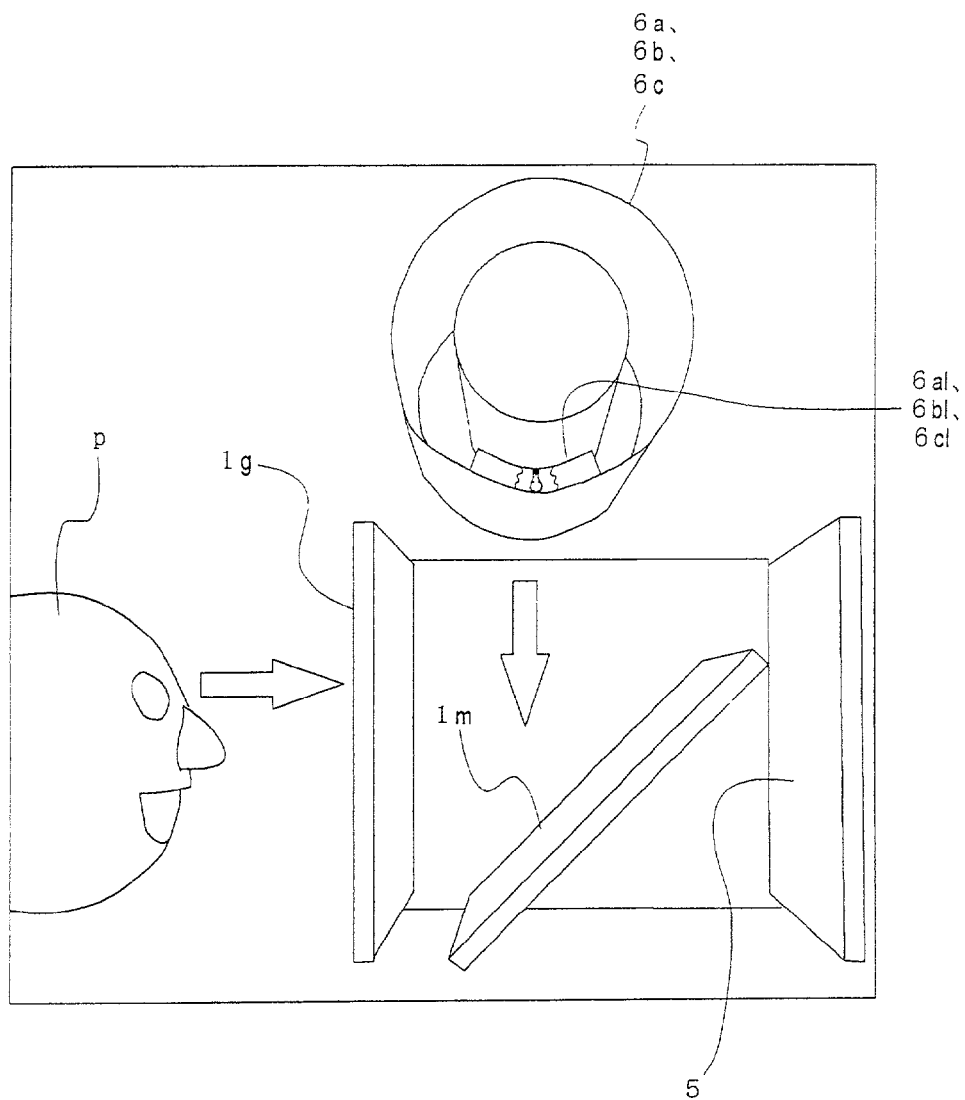
FIG. 3 is a diagram schematically showing a structure of the essential portion of the slot game machine FIG. 1 which can display virtual images and images.

As shown in FIG. 1, FIG. 2 and FIG. 3, the slot game machine 1 has a liquid crystal display panel 5 which is erected in a position to face a player p within a protection glass 1g through which the player p watches, a half mirror 1m which is disposed in front of the liquid crystal display panel 5 to forwardly lean toward the player, and one set of mechanical reels (design reels) 6a, 6b, 6c (see FIG. 4) which have designs 6an, 6bn, 6cn drawn on their peripheries and are disposed in a top box 1p above the half mirror 1m.

The slot game machine 1 has a virtual image display mode and a real image display mode as modes of a game display (display screen) 1G.

Figure 4:
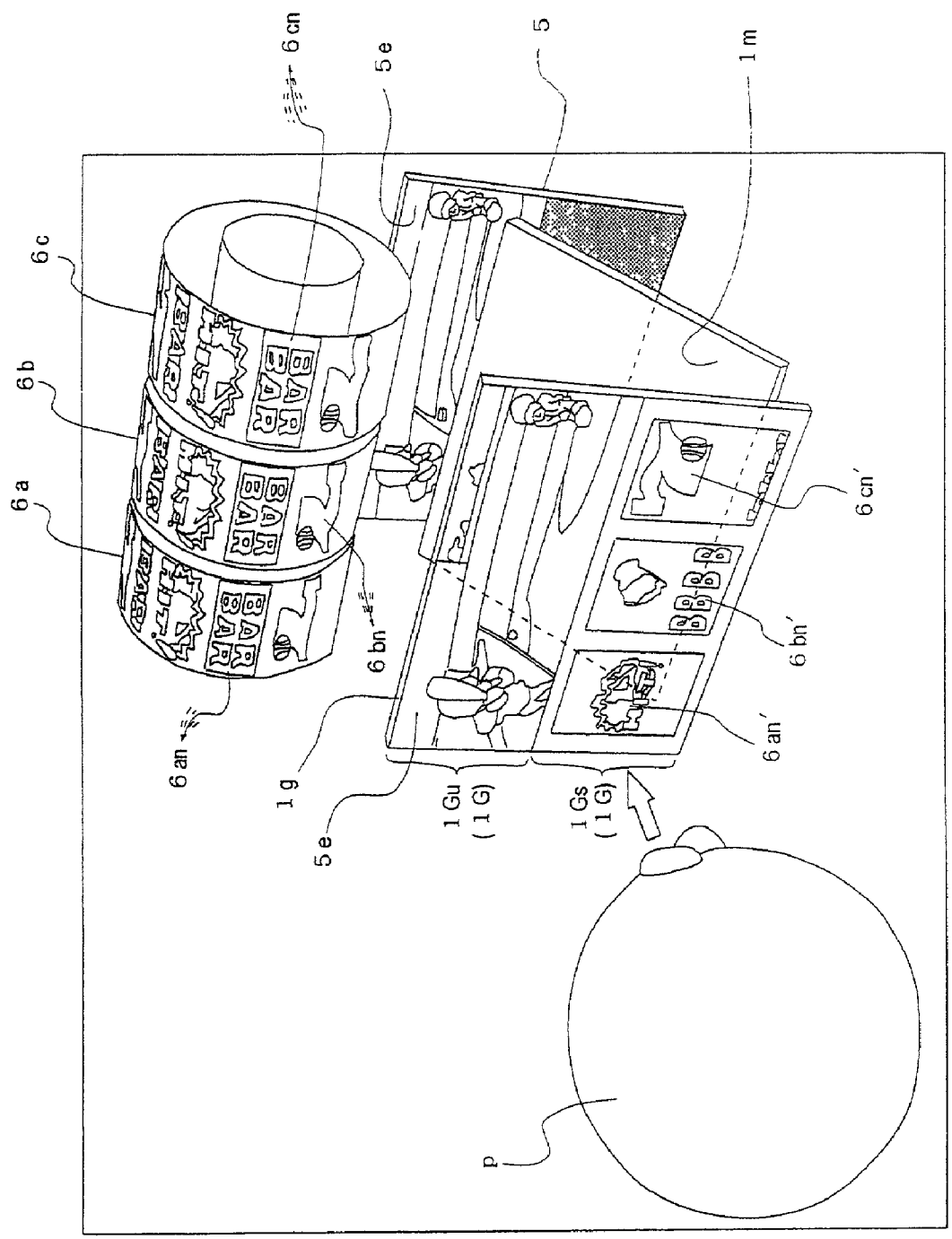
FIG. 4 is a concept diagram showing a display of a game being played on the slot game machine of FIG. 1 which can display virtual images and images.
Figure 6:
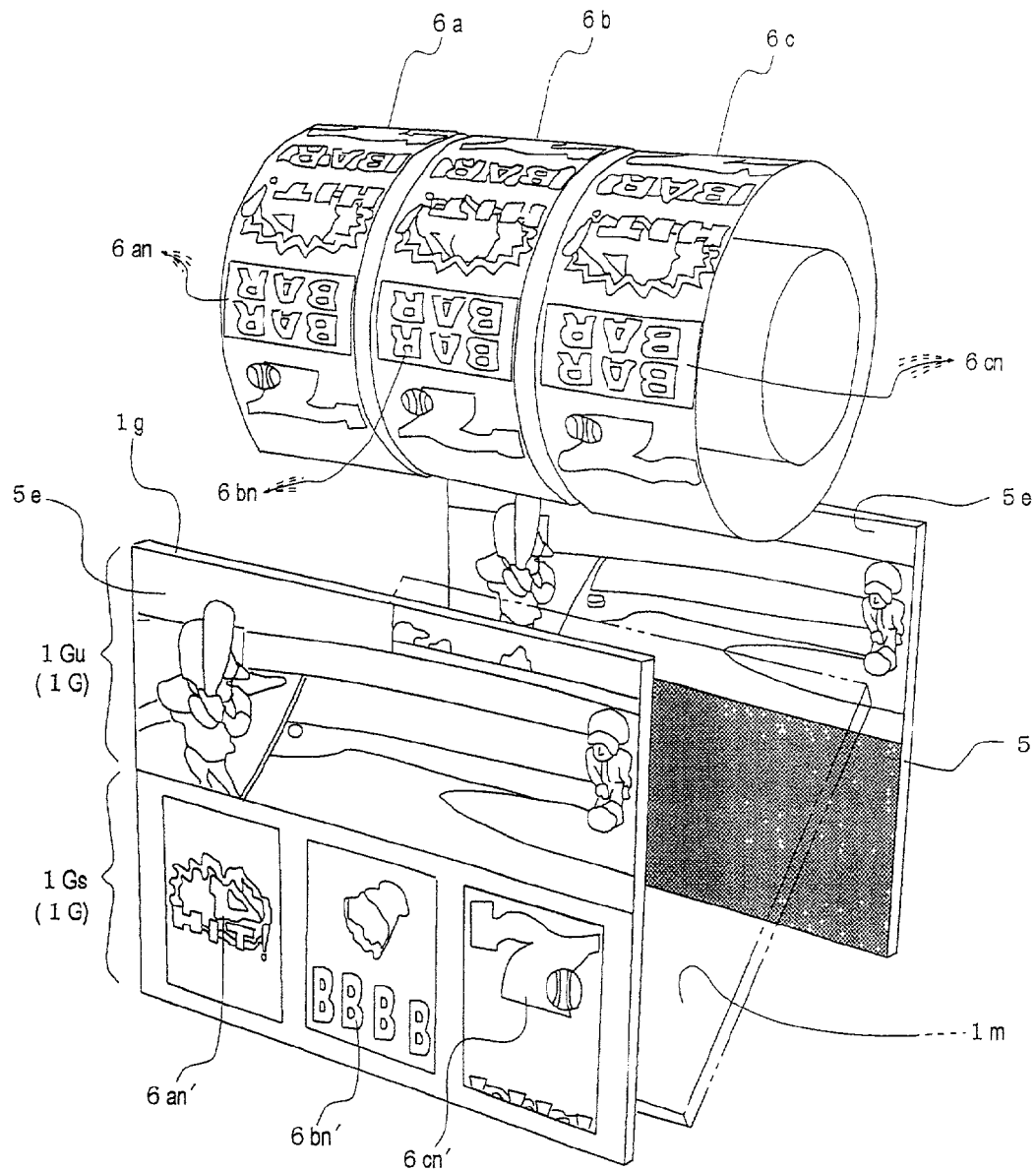
FIG. 6 is a concept diagram showing a structure of a game display which shows images in the upper half region of a game display 1G by a liquid crystal display panel and shows a game display which shows virtual images of designs on the peripheries of mechanical reels in the lower half region in the slot game machine of FIG. 1 which can display virtual images and images.

For example, in the virtual image display mode of the slot game machine 1, a representation image (representation display section) 5e shown in an upper region of the liquid crystal display panel 5 is shown in an upper half region 1Gu of the game display 1G through the half mirror 1m and virtual images (main display) 6an', 6bn', 6cn' of the designs 6an, 6bn, 6cn on the peripheries of the mechanical reels 6a, 6b, 6c reflected by the half mirror 1m are shown in a lower half region 1Gs of the game display 1G so to show the images through the protection glass 1g as shown in FIG. 4 and FIG. 6 which are concept diagrams showing a game being played.

Figure 7:
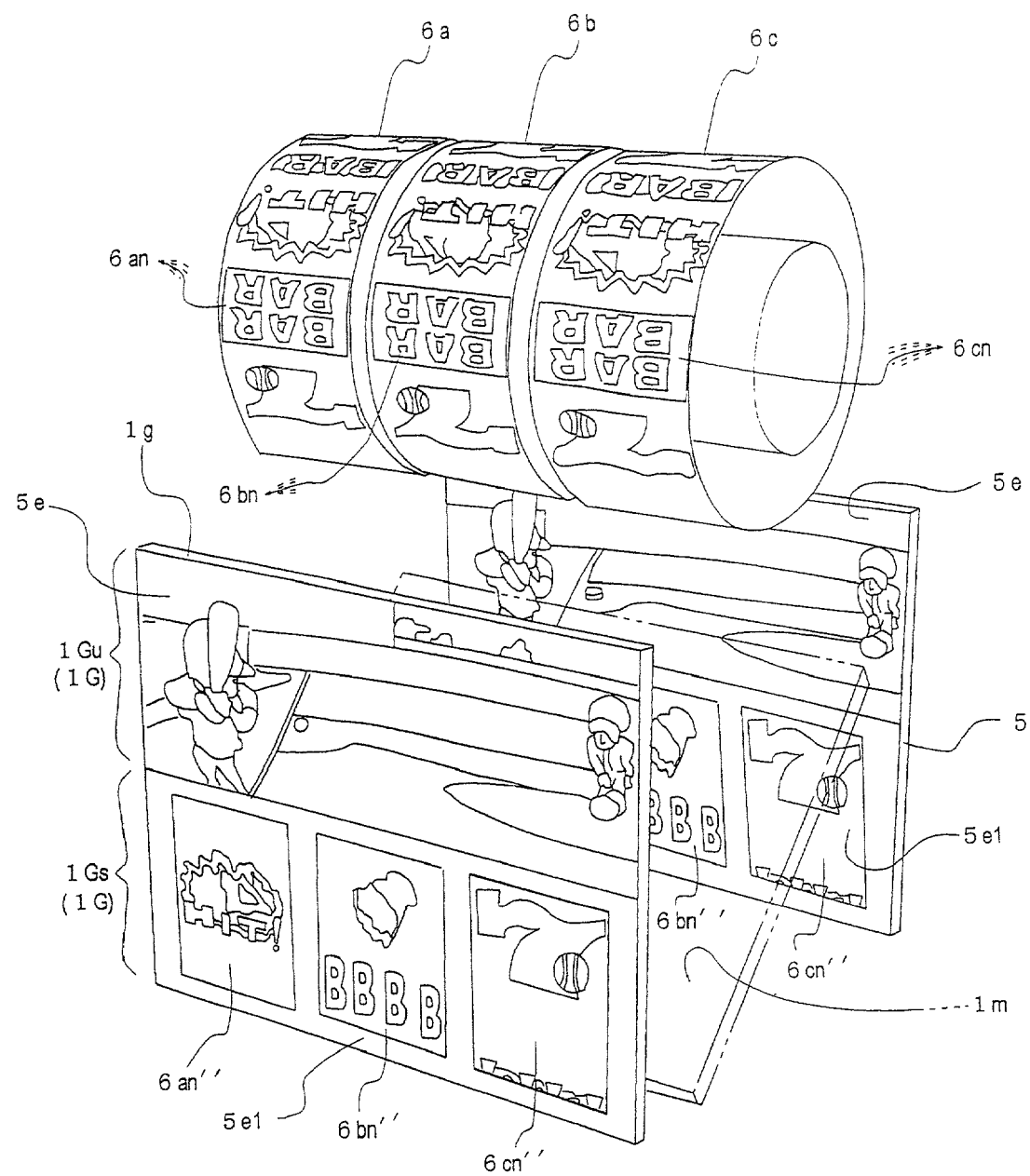
FIG. 7 is a concept diagram showing a structure of a game display which shows images by the liquid crystal display panel in the upper half region of a game display and shows image designs of the images on the peripheries of the reels in the lower half region by the liquid crystal display panel in the slot game machine of FIG. 1 which can display virtual images and images.

For example, as the real image display mode of the slot game machine 1, the image 5e to be shown in the upper region of the liquid crystal display panel 5 is shown in the upper half region 1Gu of the game display 1G through the half mirror 1m as shown in FIG. 7, a reel periphery image (main display section, design reel periphery) 5e1 is shown in a lower half region 1Gs of the liquid crystal display panel 5, and the representation image 5e and the reel periphery image 5e1 are shown in the entire region of the game display 1G within the protection glass 1g.

Figure 8A:
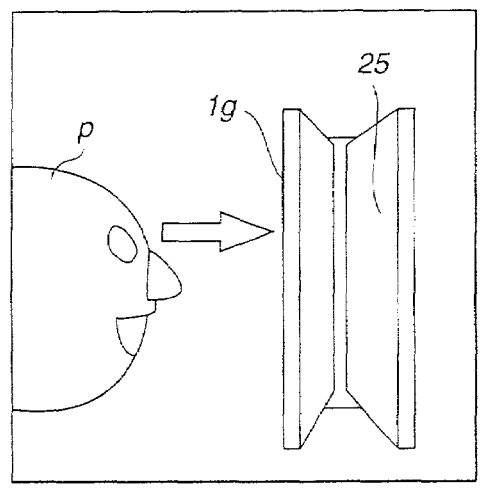
FIGS. 8(a) and 8(b) are a concept diagram showing a structure of the game display of the slot game machine having an image display only to which an embodiment of the combined representation display method according to the invention is applied and a diagram showing a structure of the control section of the slot game machine.

Meanwhile, the slot game machine 20 is configured in such a way that a liquid crystal display panel 25 is erected in a position to face the player inside the protection glass 1g through which the player p watches, a mechanical reel is not disposed, and a game is proceeded by only the images shown on the liquid crystal display panel 25 as shown in FIG. 1 and FIG. 8(a).

The game played on the slot game machine 1 and the slot game machine 20 is a slot game which is combined with the representation images. The first embodiment describes an example of a baseball game, and the second embodiment describes an example of a chicken game.

According to the baseball game of the first embodiment, the pitcher starts a pitching motion in combination with the start of spinning of the design reels (mechanical reels or image reels), the pitcher throws a ball when the design reels spin for a predetermined time and two of them stop spinning, and the batter swings in combination with the stop of the last spinning design reel and a decision of the slot game result.

When no winning hand is realized, the batter fails to hit a ball which is thrown by the pitcher, but when a winning hand is realized, the batter swings to make a hit, and prize money for the realized winning hand is shown.

When a bonus game, which is an extra game and one of the winning hands, is realized, the batter swings to make a hit and the prize money for the realized bonus game is shown. Then, the design reels move to the upper portion of the game display 1G and the representation image moves to the lower portion of the game display 1G.

Subsequently, the pitcher and the batter make motions in combination with the operation of the design reels in the same way as described above, the batter hits a ball released by the pitcher to make line drive, the batted ball hits the last spinning image reel to stop its spinning, and a decided combination of designs is shown. Thus, the slot game result is decided.

In the chicken game of the second embodiment, the spinning design reels (mechanical reels or image reels) are stopped in combination with pecking actions of three chickens respectively. Every time the chickens peck at food, they are shown to become fat because they have pecked.

When no winning hand is realized, the three fat chickens resulting from pecking at food are shown, and the game is shifted to a new slot game.

When a winning hand is realized, the three fat chickens resulting from pecking fall on their backs, and prize money for the realized winning hand is indicated on the body of one of the three chickens.

Subsequently, the three fat chickens resume the original slender body, and the game shifts to a new slot game.

Then, the structures of the slot game machine 1 and the slot game machine 20 will be described in detail.

As shown in FIG. 1 and FIG. 2, a control table 1t is protruded from the front of the slot game machine 1 to incline forward so that the player p can manually control with ease, and the transparent protection glass 1g is mounted above the control table 1t to allow the player p to watch a game space 1s in the slot game machine 1 and also to protect it.

As shown in FIG. 2, the top box 1p which accommodates the mechanical reels 6a, 6b, 6c is formed on the top of the slot game machine 1.

A shown in FIG. 2 and FIG. 3, in the game space 1s which is protected by the protection glass 1g, the liquid crystal display panel 5 which is a flat panel display is erected to display game images in a position to face the player, and the half mirror 1m is also disposed in front of the liquid crystal display panel 5 to downwardly incline at an angle of 45 degrees toward the player p.

The half mirror 1m has an inclination angle of 45 degrees, but it is to be understood that it may be disposed at any angle other than the inclination angle of 45 degrees if the designs 6an, 6bn, 6cn on the peripheries of the mechanical reels 6a, 6b, 6c are reflected by the half mirror 1m and visible as virtual images 6an', 6bn', 6cn' from the player p.

Furthermore, the liquid crystal display panel 5 is used as an image display device for showing the game images in this embodiment, but it is to be understood that another image display device such as a plasma display panel may be used instead of the liquid crystal display panel 5.

As described above, the mechanical reels 6a, 6b, 6c are housed in the top box 1t above the half mirror 1m, and as shown in FIG. 4, the player p watches the virtual images 6an', . . . , 6bn', . . . , 6cn', . . . resulting from the designs 6an, . . . , 6bn, . . . , 6cn, . . . , which are on the peripheries of the mechanical reels 6a, 6b, 6c, reflected by the lower half region 1Gs of the game display 1G inside the protection glass 1g.

The above mechanical reels 6a, 6b, 6c are formed to have a drum-like outer shell, and design sheets made of polycarbonate or the like on which the designs 6an, . . . , 6bn, . . . , 6cn, . . . are drawn are adhered to the respective peripheries of the mechanical reels 6a, 6b, 6c.

The designs 6an, . . . , the designs 6bn, . . . , and the designs 6cn, . . . are classified into, for example, seven winning hand designs and other general designs.

The mechanical reels 6a, 6b, 6c configured as described above are coaxially supported to spin about an axis extended horizontally in right and left representations of the slot game machine 1, are in good compatibility with a digital control system, and separately driven directly by a stepping motor (not shown)which rotates by a prescribed angle.

And, to stop the mechanical reels 6a, 6b, 6c at a prescribed position to be decided by an inside lottery, a position sensor I (12a), a position sensor II (12b) and a position sensor III (12c) (see FIG. 5) are applied to the mechanical reels 6a, 6b, 6c to make position control.

As the position sensors 12a, 12b, 12c, an optical sensor such as a photodiode, phototransistor or the like is selected appropriately.

It is to be understood that the rotational drive of the mechanical reels 6a, 6b, 6c may be made by a transmission mechanism appropriately employing a transmission belt, a gear mechanism or the like.

As shown in FIG. 2 and FIG. 3, a reel lamp I (6a1), a reel lamp II (6b1) and a reel lamp III (6c1), which illuminate the designs 6an, . . . , 6bn, . . . , 6cn, . . . on the peripheries of the mechanical reels 6a, 6b, 6c to show them conspicuously, are disposed within the mechanical reels 6a, 6b, 6c.

Here, the reel lamp I (6a1), the reel lamp II (6b1) and the reel lamp III (6c1) can adjust illumination by adjusting a current, and can project the designs 6an, . . . , 6bn, . . . , 6cn, . . . on the peripheries of the mechanical reels 6a, 6b, 6c onto the half mirror 1m to show as the virtual images 6an', 6bn', 6cn' with a variety of clearness by appropriately adjusting illumination.

For example, when the illumination of the reel lamps 6a1, 6b1, 6c1 is increased, the virtual images 6an', . . . , 6bn', . . . , 6cn', . . . can be shown clearly, and when the illumination of the reel lamps 6a1, 6b1, 6c1 is decreased, the virtual images 6an', . . . , 6bn', . . . , 6cn', . . . can be shown unclearly. And, when the illumination is lowered to a minimum, the designs 6an, . . . , 6bn, . . . , 6cn, . . . on the peripheries of the mechanical reels 6a, 6b, 6c can be prevented from being reflected by the half mirror 1m, so that the virtual images 6an', 6bn', . . . , 6cn', . . . are not shown in appearance and can be determined as non-display.

It is configured in this embodiment that the reel lamps 6a1, 6b1, 6c1 are disposed in the mechanical reels 6a, 6b, 6c respectively but may be disposed outside of the mechanical reels 6a, 6b, 6c.

It is seen in FIG. 1 that a coin insertion slot 2a through which a coin or coins are inserted by the player p to bet on the slot game and a paper money insertion slot 2b through which paper money is inserted to bet on the slot game are disposed on the control table 1t.

There are also disposed on the control table 1t a unit bet button 3p which is used to bet one unit every time it is pushed for a unit bet, e.g., five cents, 25 cents or one dollar, for a single game particularly determined for the slot game machine 1, a maximum bet/play button 3m which is used to bet a maximum bet every time it is pushed, e.g., a three unit bet or a five unit bet, particularly determined for the slot game machine 1 and also to start spinning of the mechanical reels 6a, 6b, 6c, and a bet display 3a for showing what units are bet.

There are also disposed on the control table 1t a play button 3s for starting to spin the mechanical reels 6a, 6b, 6c, a change button 3c for calling a person in charge to change money, and a cash out button 3o for dispensing cash in total of the balance between the bet that the player p has inserted through the coin insertion port 2a or the paper money insertion port 2b and the total amount used for the game and the won payoff for the slot game.

And, a ticket outlet port 4o is disposed on the wall below the control table 1t of the slot game machine 1, and it may dispense a token ticket for the payoff instead of cash.

A payoff return port 4u is disposed to protrude from the wall below the ticket outlet port 4o, where the token tickets discharged from the ticket outlet port 4o or coins to be dispensed from a hopper (not shown) when the game is over and settled in cash are accumulated.

Then, a structure of the control section of the slot game machine 1 will be described.

Figure 5:
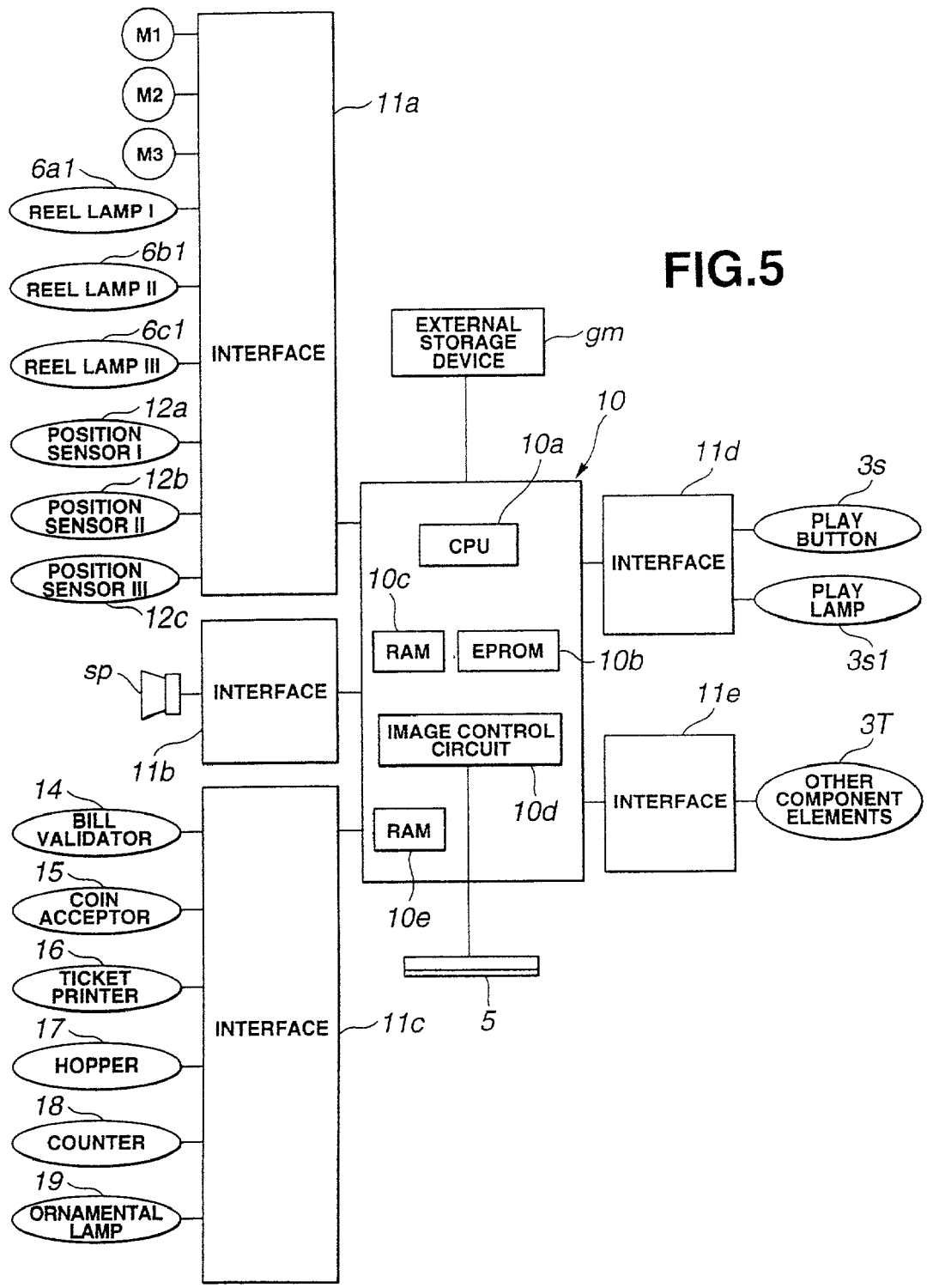
FIG. 5 is a diagram showing a structure of the control section of the slot game machine of FIG. 1 which can display virtual images and images.

As shown in FIG. 5, a control section 10 for controlling the slot game machine 1 is comprised of a CPU (central processing unit) 10a which is the core of the control, an EPROM (erasable programmable ROM) 10b on which a control program is contained in advance, a RAM (random access memory) 10c for storing work data, an image control circuit 10d which controls image data to convert into and output an analog image signal, a RAM 10e as a graphic memory, and the like.

A series of operation of the slot game machine 1 is performed by the CPU 10a which executes the control program stored in the EPROM 10b.

Processing by the aforementioned control program includes drive and stop position control of the stepping motors which drive to spin the mechanical reels 6a, 6b, 6c respectively, game image output control, bet processing upon the input operation by the player, a variety of processing such as calculation of the balance of bets, control for printing and dispensing token tickets, control for blinking operation of various types of lamps, game sound output control, etc.

And, the EPROM 10b includes control data, tables, etc. for controlling spinning drive and stop of the mechanical reels 6a, 6b, 6c.

The tables stored in the EPROM 10b include a realized winning hand design combination table, a mechanical reel stop control table, etc.

The realized winning hand design combination table stores data which determines winning hand designs for deciding the realization of winning hand and data on prize money presented to the player according to the realization of various winning hands.

Here, the realization of winning hand determined by a combination of designs shown on the respective mechanical reels 6a, 6b, 6c which have stopped spinning is set using random numbers generated at a prescribed probability among the random numbers generated by a random number generator (not shown). This processing is called as the inside lottery.

The stop control table used for stop control of the mechanical reels includes a record of the designs of the mechanical reels 6a, 6b, 6c in relation with their arrangement. When a relation of relative positions between any two of the designs of the respective mechanical reels 6a, 6b, 6c is determined, a relation of relative positions between other designs is naturally decided.

For example, when the number of designs of the respective mechanical reels 6a, 6b, 6c is 16, design codes 1 to 16 are allotted to the designs 6an, . . . , 6bn, . . . , 6cn, . . . of the mechanical reels 6a, 6b, 6c. And, referring to the design of the design code 1 as a standard, a relation of relative positions of other designs is recognized, and it is controlled to stop the mechanical reels 6a, 6b, 6c.

The RAM 10c produces a work area when the control program is executed and temporarily stores variable data or the like.

Specifically, the stored data include whether the mechanical reels 6a, 6b, 6c are spinning or stopped, what designs are shown by the mechanical reels 6a, 6b, 6c, whether the image reels are spinning or stopped, what image designs are indicated as designs shown by the image reels, the amount inserted by the player p, bet information, the balance, the gained prize money and the like.

The CPU 10a executes the control program stored in the EPROM 10b to control the stepping motors for spinning drive of the mechanical reels 6a, 6b, 6c, to make output processing of an image signal to the image control circuit 10d, and to make the entire control of the slot game machine 1, such as a variety of processing according to the input operation by the player.

The aforementioned control section 10 is connected to an external storage device gm such as a CD-ROM, whicth previously stores as image data for the game, image designs (main displays) 6an", 6bn", 6cn" in the same number and kind as the designs 6an, 6bn, 6cn on the peripheries of the mechanical reels 6a, 6b, 6c, the reel periphery image 5e1, the representation images 5e, 6e, representation patterns to be used for reel background image 6eh, and the like.

The control section 10 is also connected to the stepping motor M1, the stepping motor M2 and the stepping motor M3 which drive the mechanical reels 6a, 6b, 6c respectively, the reel lamp I (6a1), the reel lamp II (6b1) and the reel lamp III (6c1) in the respective mechanical reels 6a, 6b, 6c, and the position sensor I (12a), the position sensor II (12b) and the position sensor III (12c) which detect the spin positions of the mechanical reels 6a, 6b, 6c through an interface 11a including a motor drive circuit, a sensor circuit and the like.

The control section 10 is connected to a loud speaker sp, which outputs game effect sounds, through an interface 11b. The interface 11b is a voice circuit which decodes the voice signal to output as an audio signal to the loud speaker sp.

The control section 10 is also connected through an interface 11c such as a chattering prevention circuit or the like to a bill validator 14 for reading paper money inserted through the paper money insertion slot 2b, a coin acceptor 15 for checking whether coins inserted through the coin insertion port 2a are authentic or not, a ticket printer 16 for printing token tickets, a hopper 17 for dispensing coins at the end of a game for payoff in cash, a counter 18 for counting the amount inserted into the slot game machine 1, the payoff amount and the like for the game machine administrator, decoration lamps 19 for providing game effect illumination, and the like.

And, the control section 10 is connected to component elements 3T such as other buttons through an interface 1e.

The CPU 10a of the control section 10 is connected to the liquid crystal display panel 5 through the image control circuit 10d.

The CPU 10a reads picture image data such as image designs 6an", 6bn", 6cn", representation patterns and the like stored in the CD-ROM of the external storage device gm, produces an image signal and outputs the image signal to the image control circuit 10d.

Specifically, using the image data of the image designs 6an", 6bn", 6cn", an image signal of the reel periphery image 5e1 of the same image reels which are spinning or stopped as the peripheries of the mechanical reels 6a, 6b, 6c having the designs 6an, 6bn, 6cn and the image signals such as the representation images 5e, 6e using the image data of the representation patterns, the reel background image 6eh are produced.

Here, the spinning reel periphery image 5e1 is produced in such a way that it is shown at the same spinning angle speed as those of the respective mechanical reels 6a, 6b, 6c.

In the image control circuit 10d, the RAM 10e which is a graphic memory is used to perform actual drawing processing, digital-to-analog conversion or the like from the image signal input from the CPU 10a, to output as an RGB signal to the liquid crystal display panel 5. And, the liquid crystal display panel 5 shows images.

Specifically, the game images shown on the liquid crystal display panel 5 of the slot game machine 1 are previously produced for respective parts, e.g., representation images, image reels, winning hand prize money, etc. and stored in the external storage device gm. And, such parts are combined in the CPU 10a and output as an image signal to the image control circuit 10d to make the game display.

Then, the game display 1G within the protection glass 1g of the slot game machine 1 will be described.

The game display 1G of the slot game machine 1 has a virtual image display mode and a real image display mode.

For example, the virtual image display mode shows the representation image 5e in the upper half region of the liquid crystal display panel 5 and a dark color entirely in the lower half region as shown in FIG. 6.

At the same time, the respective reel lamps I (6a1), II (6b1), III (6c1) within the mechanical reels 6a, 6b, 6c are raised illumination and lit so to conspicuously illuminate the designs 6an, . . . , 6bn, . . . , 6cn, . . . on the peripheries of the mechanical reels 6a, 6b, 6c and reflected by the half mirror 1m so to show the virtual images 6an', 6bn', 6cn' in the lower half region 1Gs of the game display 1G corresponding to the dark colored lower half region of the liquid crystal display panel 5.

Specifically, a real image or the representation image 5e, and virtual images, which are the virtual images 6an', 6bn', 6cn' of the designs 6an, 6bn, 6cn, are shown on the same game display 1G.

In this case, the layer p visually recognizes the representation image 5e, which is in the upper half region of the liquid crystal display panel 5, in the upper half region 1Gu of the game display 1G through the protection glass 1g, and visually recognizes the virtual images 6an', 6bn', 6cn' of the designs 6an, 6bn, 6cn of the mechanical reels 6a, 6b, 6c in the lower half region 1Gs of the game display 1G.

Meanwhile, as the aforementioned real image display mode, as shown in FIG. 7, the reel lamp I (6a1), the reel lamp II (6b1) and the reel lamp III (6c1) in the mechanical reels 6a, 6b, 6c are turned off while the representation image 5e is being shown in the upper half region of the liquid crystal display 5, the reel periphery image 5e1 having the image designs (designs, main displays) 6an", 6bn", 6cn" in the lower half region of the liquid crystal display 5 are shown, and the representation image 5e and the reel periphery image 5e1 are shown in the entire region of the game display 1G within the protection glass 1g.

Therefore, the same image display can be made as the display of the virtual images of the mechanical reels 6a, 6b, 6c using the reel periphery image 5e1 shown by the liquid crystal display 5 to proceed the game in the real image display mode.

Then, a structure of the slot game machine 20 will be described.

As shown in FIG. 1, the structure of the exterior section of the slot game machine 20 is the same as the exterior section of the slot game machine 1, so that like reference numerals are allotted to them, and their description will be omitted.

The control table 1t is protruded from the front of the slot game machine 20 to incline forward so that the player p can manually control with ease, and the transparent protection glass 1g is mounted above the control table 1t to allow the player p to watch in the slot game machine 20 and also to protect it.

And, as shown in FIG. 8(a), the liquid crystal display panel 25, which is a flat panel display for showing game images in a position to face the player, is erected inside the protection glass 1g.

In this embodiment, the liquid crystal display panel 25 is used as an image display device for showing the game images, but it is to be understood that another image display device such as a plasma display panel may be used instead of the liquid crystal display panel 25.

Then, the structure of the control section of the slot game machine 20 shown in FIG. 8(b) will be described.

The control section of the slot game machine 20 partly includes the same structure as that of the control section of the aforementioned slot game machine 1. Therefore, like reference numerals are used to indicate like components and their description will be omitted.

Figure 8B:
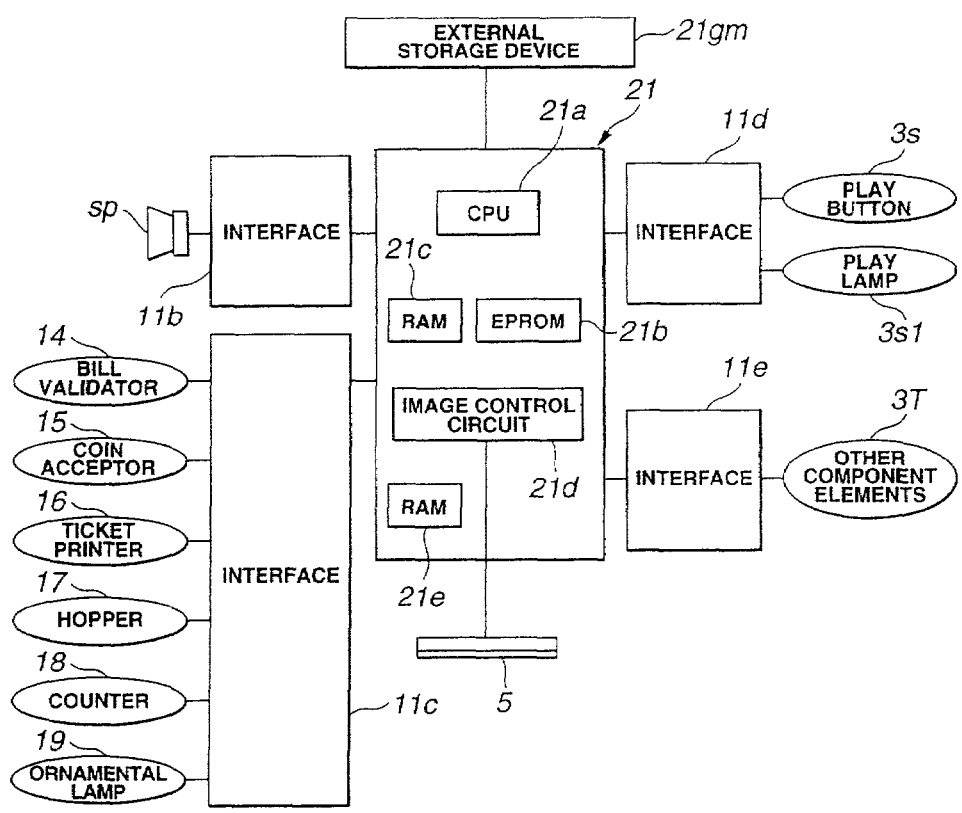

As shown in FIG. 8(b), the control section 21 for controlling the slot game machine 20 is comprised of a CPU 21a which is the core of the control, an EPROM 21b on which a control program is contained in advance, a RAM 21c for storing work data, an image control circuit 21d which controls image data to convert into and output an analog image signal, and a RAM 21e as a graphic memory.

A series of operation of the slot game machine 20 is performed by the CPU 21a which executes the control program stored in the EPROM 21b.

Processing by the aforementioned control program includes game image output control for image reels, game representation and the like, bet processing upon the input operation by the player p, a variety of processing such as calculation of the balance of bets, control for printing and dispensing token tickets, control for blinking operation of various types of lamps, game sound output control, etc.

The EPROM 21b has control data, tables, etc. for controlling spinning display and stop display of the image reels (design reels) 26a, 26b, 26c.

The tables stored in the EPROM 21b include a realized winning hand image design combination table, an image reel stop display table, etc.

The above realized winning hand image design combination table stores data which determines image winning hand designs for deciding the realization of winning hand and data on prize money presented to the player according to various winning hands realized.

Here, the realization of winning hand determined by a combination of image designs shown on the respective image reels 26a, 26b, 26c which have stopped spinning is set according to random numbers generated at a prescribed probability among the random numbers generated by a random number generator (not shown). The inside processing is called as the inside lottery.

The stop display table used for the stop display of the image reels has the image designs of the respective image reels 26a, 26b, 26c recorded in connection with the arrangement thereof.

And, the order of displaying the image designs is determined and image data is created previously so that when a relation of relative positions between any two of the image designs of the respective image reels 26a, 26b, 26c is determined, a relation of relative positions between other image designs is naturally decided.

For example, when the number of image designs of the respective image reels 26a, 26b, 26c is 16, image design codes 1 to 16 are allotted to the image designs (main displays) 26an, . . . , 26bn, . . . , 26cn, . . . of the image reels 26a, 26b, 26c, a relation of relative positions of other image designs is recognized with reference to the image design of the image design code 1, and the spinning and stop display of the image reels 26a, 26b, 26c is performed.

The RAM 21c generates a work area at the execution of the above control program and temporarily stores variable data or the like.

Specifically, the stored data includes whether the image reels are spinning or stopped, what image designs are shown by the image reels, the amount inserted by the player p, bet information, the balance, the gained prize money and the like.

The above CPU 21a executes the control program stored in the EPROM 21b to make the general control of the entire slot game machine 20, such as the spinning display and stop display of the aforementioned image reels 26a, 26b, 26c, output processing of an image signal to the image control circuit 10d related to the image display such as the game representation display or the like, and a variety of processing according to the input operation by the player p.

The aforementioned control section 21 is connected to an external storage device 21gm such as a CD-ROM, which previously stores as image data for the game, the reel periphery image 25e1 on the peripheries of the image reels 26a, 26b, 26c on which the image designs 26an, 26bn, 26cn are drawn, and representation patterns used for the representation images 25e, 26e and the reel background image 26eh.

The CPU 21a of the control section 21 is also connected to the liquid crystal display panel 25 through the image control circuit 21d.

The CPU 21a reads image data such as the image designs 26an, 26bn, 26cn on the peripheries of the image reels 26a, 26b, 26c, patterns for representation, or the like which are stored in the CD-ROM of the external storage device 21gm, produces image signals and outputs the image signals to the image control circuit 21d.

Specifically, the image signals of the reel periphery image 25e1 of the image reels which are spinning or stopped and the image signals of the representation images 25e, 26e using the image data on the representation patterns and the reel background image 6eh are produced using image data on the image designs 26an, 26bn, 26cn on the peripheries of the image reels 26a, 26b, 26c.

Here, the spinning reel periphery image 25e1 is created in such a way that it is shown at the same circumferential velocity as the spinning angle speed of the generally used mechanical reels.

In the image control circuit 21d, the RAM 21e which is a graphic memory is used to perform actual drawing processing, digital-to-analog conversion or the like from the image signal input from the CPU 21a and to output as an RGB signal to the liquid crystal display panel 25. The liquid crystal display panel 25 shows images in the entire game display 1G.

Specifically, the game images shown on the liquid crystal display panel 25 of the slot game machine 20 are previously created for respective parts, e.g., representation images, image reels, winning hand prize money images, etc. and stored in the external storage device 21gm. And, such parts are combined by the CPU 21a and output as the image signals to the image control circuit 21d to make the game display.

Then, display control of the baseball game of the first embodiment will be described.

Figure 9:
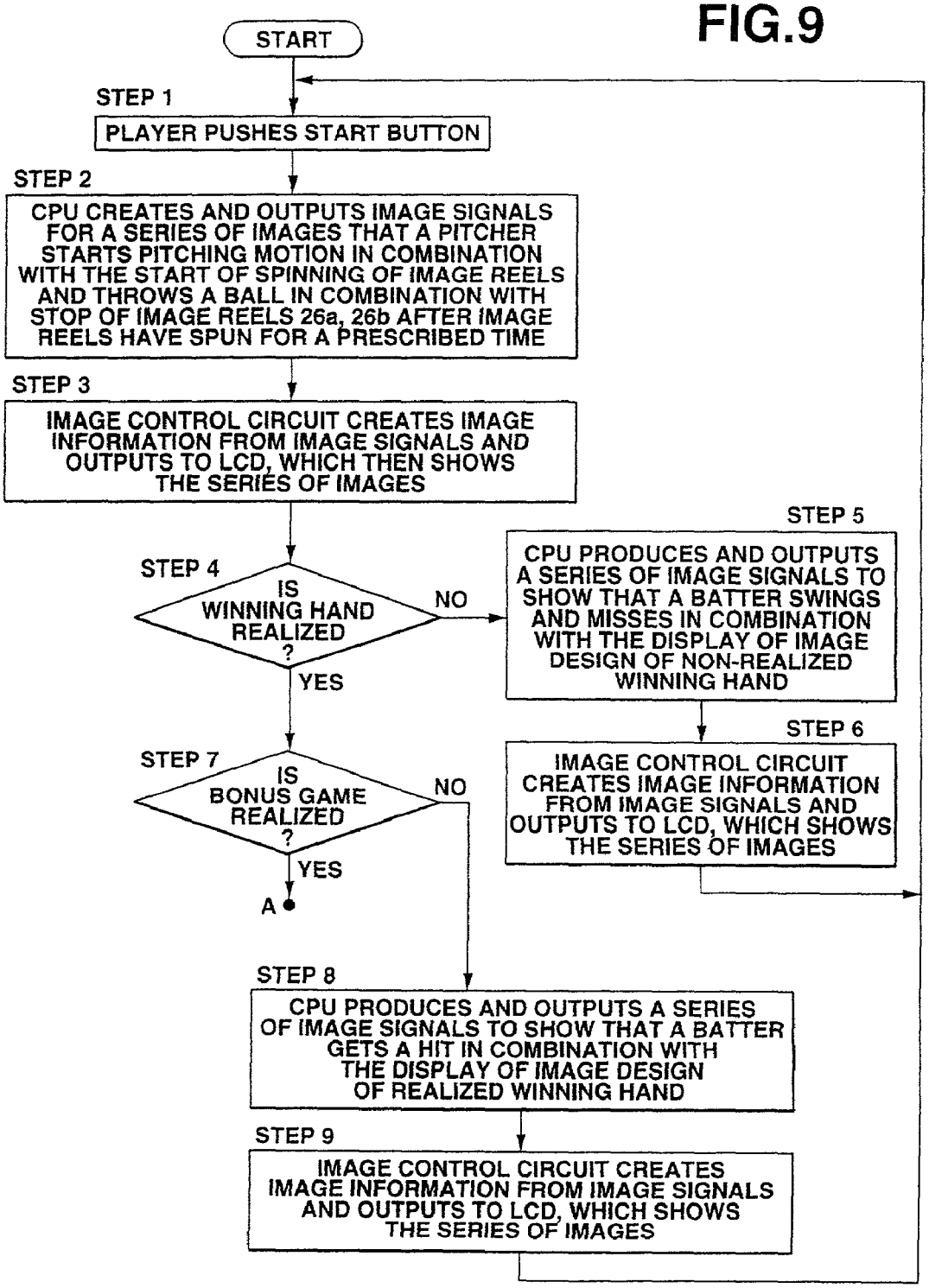
FIG. 9 is a flow chart of a display control process when a baseball game as a first embodiment of the invention is played on the slot game machine having the image display only.

First, the display control to be made when the baseball game is played on the image display of the liquid crystal display panel 25 using the slot game machine 20 will be described with reference to FIG. 9 and FIG. 10.

As described above, the control program stored in the EPROM 21b is executed by the CPU 21a to make the aforementioned display control.

Figure 11A:
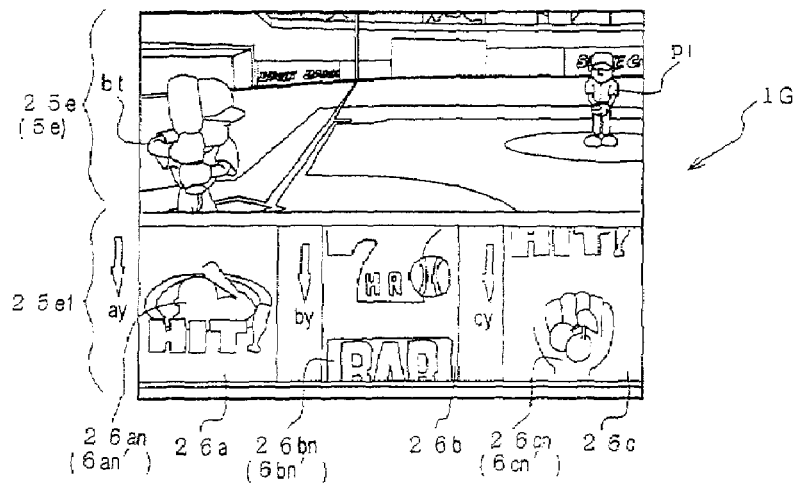
FIGS. 11(a), 11(b) and 11(c) are a diagram showing a game display at the start of spinning of design reels of the baseball game of the first embodiment according to the invention, a diagram showing a game display when a winning hand is realized, and a diagram showing a game display when a winning hand is not realized.

To start the game, the game display 1G which is recognized by the player p through the protection glass 1g of the slot game machine 20 shows as the representation image (representation display section) 25e in the upper half region of the game display 1G as shown in FIG. 11(a) that a pitch pi is in set position and a batter bt is ready to swing in the batter's box on the liquid crystal display panel 25.

And, the liquid crystal display panel 25 shows the images to show as the reel periphery image (main display section, design reel peripheries) 25e1 in the lower half region of the game display 1G that the image reels 26a, 26b, 26c, which have the image design 26an, the image design 26bn and the image design 26cn drawn on their peripheries, are stopped.

(Step 1)

To start the game, the player p inserts coins into the coin insertion slot 2a or paper money into the paper money insertion slot 2b to insert bets into the slot game machine 1 shown in FIG. 1, and pushes the unit bet button 3a for the same number of times as a desired number of unit bets among the inserted bet so to bet on the next slot game.

When the player p wants to bet a maximum unit bet on the slot game, he or she pushes the maximum bet/start button 3m.

When the maximum bet/start button 3m is pushed, a start signal is input from the maximum bet/start button switch (not shown) to the CPU 21a through the interface 11e.

Here, when the player p does not push the maximum bet/start button 3m, he or she pushes the play button 3s to spin the image reels 26a, 26b, 26c.

When the play button 3 s is pushed, the start signal is input from the start button switch (not shown) to the CPU 21a through the interface 11e.

(Step 2)

When the start signal is input, the CPU 21a performs the inside lottery, and produces image signals from the image data stored in the external storage device gm to show as the representation image 25e in the upper half region of the game display 1G that the pitcher (first character as the character of claim 1) pi winds up and starts a pitching motion (first action) immediately when the image reel 26a starts to spin in the direction of an arrow ay, the image reel 26b starts to spin in the direction of an arrow by and the image reel 26c starts to spin in the direction of an arrow 26c as the reel periphery image 25e1 in the lower half region of the game display 1G as shown in FIG. 11(a), and outputs the image signals to the image control circuit 21d.

Subsequently, the CPU 21a produces image signals to show a series of processes, as the representation image 25e in the upper half region of the game display 1G, that the pitcher pi starts the pitching motion and winds up to throw a ball to the batter (second character as the character of claim 5) bt in combination with a series of processes as the reel periphery image 25e1 in the lower half region of the game display 1G that the image reels 26a, 26b, 26c spin for a prescribed time, the image reel 26a first stops spinning, the image reel 26b then stops spinning and the image reel 26c only is spinning, and outputs the image signals to the image control circuit 21d.

(Step 3)

The image control circuit 21d sequentially creates from the image signals input with a lapse of time a series of image information to display a process that the pitcher pi starts the pitching motion and winds up to throw a ball to the batter bt as the representation image 25e in combination with a process that when the image reels 26a, 26b, 26c start to spin as the reel periphery image 25e 1 in the lower half region of the game display 1G, the pitcher pi winds up to start the pitching motion as the representation image 25e in the upper half region of the game display 1G at the same time, then after the image reels 26a, 26b, 26c spin for a prescribed time, the image reel 26a and the image reel 26b stop spinning in this order and the image reel 26c only is spinning. In other words, it creates a series of image information to show a process that when the pitcher pi winds up to start the pitching motion, the image reels 26a, 26b, 26c start to spin at the same time, and in combination with the action that the pitcher pi winds up and throws a ball to the batter bt, the image reels 26a, 26b, 26c spin for a prescribed time, then the image reel 26a and the image reel 26b stop spinning in this order, and the image reel 26c only is spinning, and outputs the image information to the liquid crystal display panel 25, and the liquid crystal display panel 25 sequentially shows the series of images (see FIG. 11 (a)).

(Step 4)

The CPU 21a obtains the result of the inside lottery from the inside lottery work data stored in the RAM 21c to judge whether a winning hand is realized.

(Step 5)

Figure 11B:
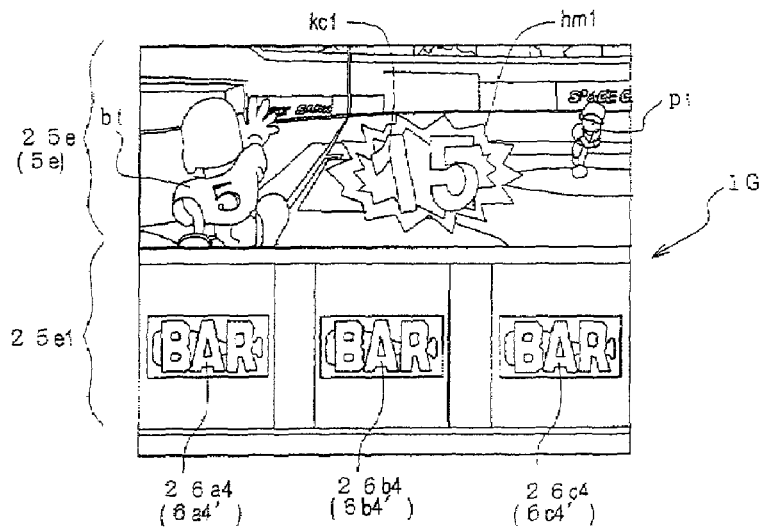
Figure 11C:
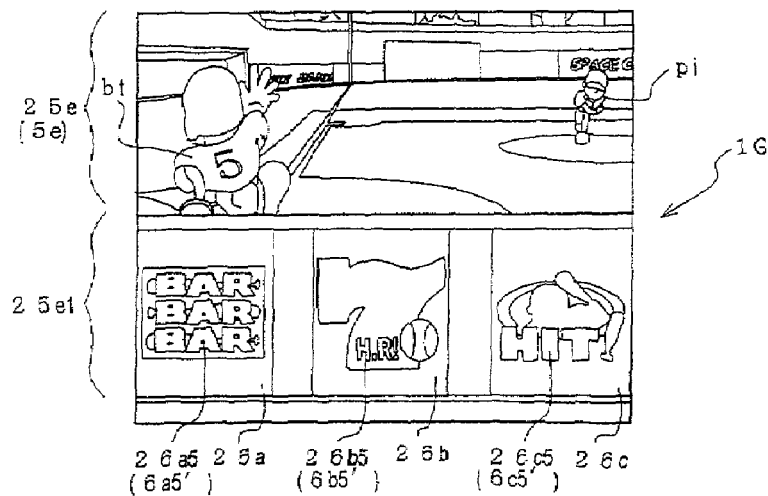

If a winning hand is not realized, the CPU 21a produces image signals from the image data stored in the external storage device gm to show, as shown in FIG. 11(c), a series of processes as the reel periphery image 25e1 in the lower half region of the game display 1G that the image reels 26a, 26b stop spinning and then the image reel 26c stops spinning to show image designs 26a5, 26b5, 26c5 indicating no realization of a winning hand, and to show in combination with the above series of processes a process as the representation image 25e in the upper half region of the game display 1G that the above image reel (the last spinning design reel of claim 5) 26c stops spinning, and at the same time, the batter bt swings (second action) and misses (fourth action) the ball thrown by the pitcher pi, and outputs the image signals to the image control circuit 21d.

(Step 6)

The image control circuit 21d creates, from the input image signals, image information to show a series of processes as the reel periphery image 25e1 in the lower half region of the game display 1G that after the image reels 26a, 26b stop spinning, the image reel 26c stops spinning, and image designs 26a5, 26b5, 26c5 of non-realization of a winning hand are shown, and to show in combination with the above series of reel periphery image 25e1, a process as the representation image 25e in the upper half region of the game display 1G that the image reel 26c stops spinning, and at the same time, the batter bt swings and misses the ball thrown by the pitcher pi. In other words, it creates image information to show a process that the image reel 26c stops spinning at the same time when the batter bt swings and misses the ball thrown by the pitcher pi, and outputs the image information to the liquid crystal display panel 25, and the liquid crystal display panel 25 shows the series of reel periphery images 25e1 and images of the associated representation image 25e (see FIG. 11(c)).

(Step 7)

The CPU 21a obtains the result of the inside lottery from the inside lottery work data stored in the RAM 21c and judges whether the bonus game is realized.

(Step 8)

When the bonus game is not realized and another winning hand is realized, the CPU 21a obtains data on prize money presented to the player according to the realized winning hand from the winning hand realization image design set table based on the inside lottery work data.

Then, the CPU 21a produces image signals from the image data stored in the external storage device gm to show, as shown in FIG. 11(b), a series of processes as the reel periphery image 25e1 in the lower half region of the game display 1G that the image reels 26a, 26b stop spinning and then the image reel 26c stops spinning to show image designs 26a4, 26b4, 26c4 indicating a realized winning hand, and to show a series of processes that when the image reel 26c stops spinning in combination with the above series of reel periphery images 25e1 to realize a winning hand as the representation image 25e in the upper half region of the game display 1G, the batter bt swings to hit a ball thrown by the pitcher pi (third action) at the same time, and the prize money (obtained payoff) kc1 is shown for the realized winning hand with a hit mark hm1 as the background, and outputs the image signals to the image control circuit 21d.

(Step 9)

The image control circuit 21d creates image information from the input image signals to show a series of processes as the reel periphery image 25e1 in the lower half region of the game display 1G that the image reel 26c stops subsequent to the image reels 26a, 26b, and the image designs 26a4, 264b, 264c of the realized winning hand are shown and a series of processes as the representation image 25e in the upper half region of the game display 1G that when the image reel 26c stops to form the winning hand and, at the same time, the batter bt swings and hits the ball thrown by the pitcher pi in combination with the above series of reel periphery images 25e1, and the prize money kc1 for the realized winning hand is shown. In other words, it creates image information to show the process that the batter bt swings and hits the ball thrown by the pitcher pi and, at the same time, the image reel 26c stops spinning to form the winning hand, and outputs the image information to the liquid crystal display panel 25. And, the liquid crystal display panel 25 shows images of the series of reel periphery images 25e1 and the combined representation image 25e (see FIG. 11(b)).

At the same time, the CPU 21a outputs a voice signal to the interface 11b, and atmos "crack" is issued through the loud speaker sp.

The display of the prize money kc1 is erased in a prescribed time, but the gained prize money kc1 is added as a gained credit to the obtained credit work data stored in the storage area of the RAM 10c and also shown on a separately fixed prize meter (not shown).

Figure 10:
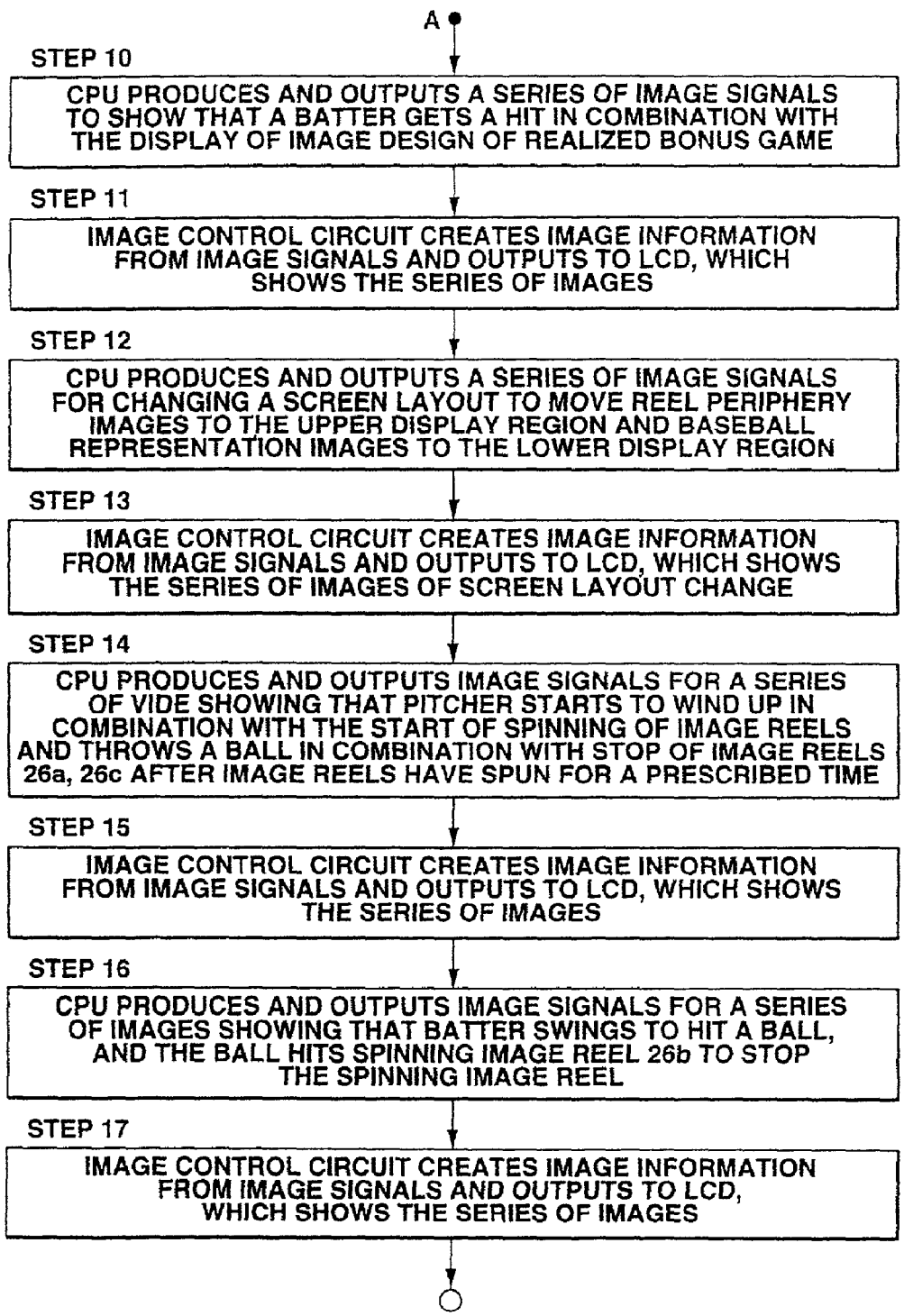
FIG. 10 is a flow chart of a display control process of a bonus game when the baseball game of the first embodiment of the invention is played on the slot game machine having the image display only.

See FIG. 10 for the following procedure.

(Step 10)

After the bonus game is realized, the CPU 21a obtains data on the prize money to be presented to the player according to the realization of the bonus game from the winning hand realization image design set table.

Figure 12A:
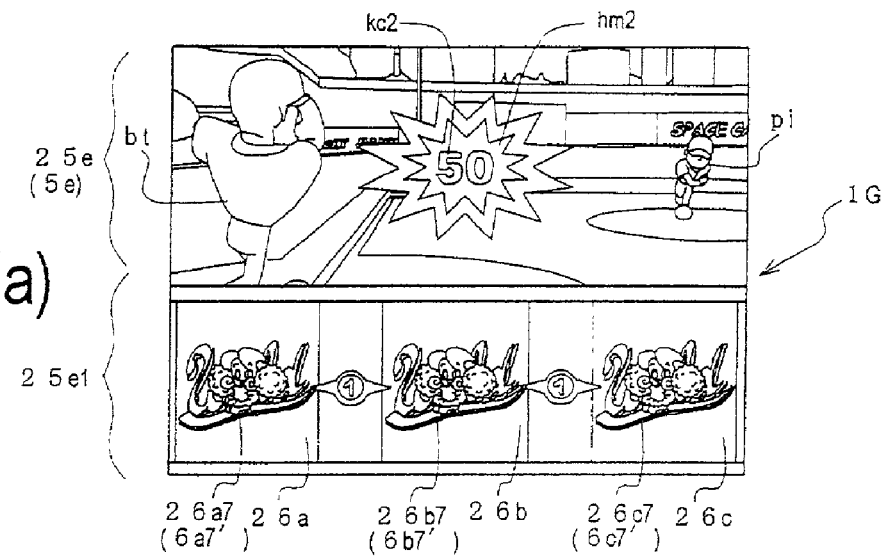
FIGS. 12(a), 12(b) and 12(c) are a diagram showing a game display when a bonus game is realized in the baseball game of the first embodiment of the invention, a diagram showing a game display when the bonus game is realized and the design reels are moving, and a diagram showing a game display when the design reel spinning last is stopped in the bonus game.

Then, the CPU 21a produces image signals from the image data stored in the external storage device gm to show a series of processes as the reel periphery image 25e1 in the lower half region of the game display 1G that the image reels 26a, 26b stop, then the image reel 26c stops spinning to show image designs 26a7, 26b7, 26c7 of the realized bonus game as shown in FIG. 12(a) and to show a series of processes as the representation image 25e in the upper half region of the game display 1G that when the image reel 26c stops spinning to form the bonus game in combination with the above series of reel periphery images 25e1, the batter bt swings and hits the ball thrown by the pitcher pi at the same time, and prize money (gained payoff) kc2 for the realized winning hand is shown with the hit mark hm2 as the background, and outputs the image signals to the image control circuit 21d.

(Step 11)

The image control circuit 21d creates image information from the input image signals to show a series of processes as the reel periphery image 25e1 in the lower half region of the game display 1G that the image reel 26c stops subsequent to the stop of the image reels 26a, 26b, and the image designs 26a7, 26b7, 26c7 of the realized bonus game are shown and a series of processes as the representation image 25e in the upper half region of the game display 1G that in combination with the above series of reel periphery image 25e1, the image reel 26c stops to form the bonus game, and at the same time the batter bt swings and hits the ball thrown by the pitcher pi, and prize money kc2 for the realized bonus game is shown. In other words, it creates image information to show a process that when the batter bt swings and hits the ball thrown by the pitcher pi, the image reel 26c stops spinning at the same time to form the bonus game, and outputs the image information to the liquid crystal display panel 25. And, the liquid crystal display panel 25 shows the above series of reel periphery images 25e1 and its associated representation image 25e (see FIG. 12(a)).

At the same time, the CPU 21a outputs the voice signals to the interface 11b and outputs atmos "crack" through the loud speaker sp.

The display of the prize money kc2 is erased in a prescribed time but the gained prize money kc2 is added as the gained credit to the gained credit work data stored in the storage area of the RAM 10c and shown in a separately fixed prize meter.

(Step 12)

Figure 12B:
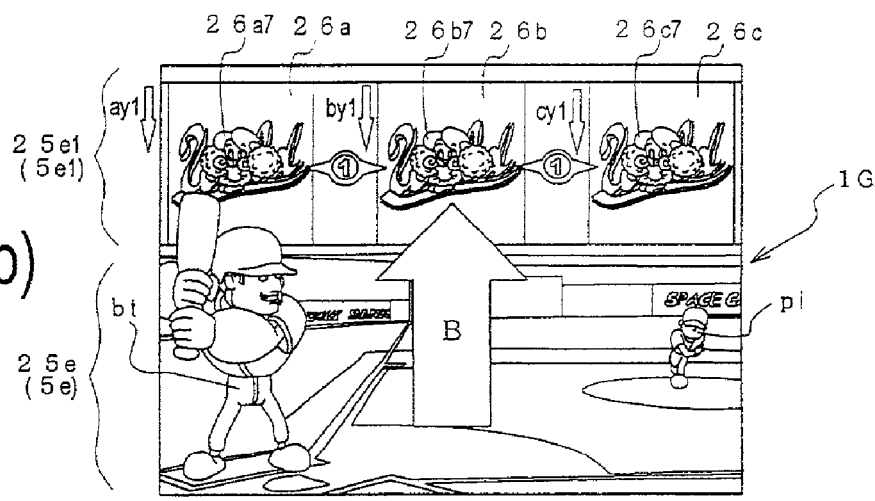

The CPU 21a produces image signals for changing a screen layout which shows a process of shifting the reel periphery image 25e1 having the bonus game image designs 26a7, 26b7, 26c7 shown in the lower half region of the game display 1G shown in FIG. 12(a) in the direction of arrow B to the upper half region of the game display 1G as shown in FIG. 12(b), and conversely moving the baseball representation image 25e shown in the upper half region of the game display 1G shown in FIG. 12(a) to the lower half region of the game display 1G, and outputs the image signals to the image control circuit 21d.

(Step 13)

The image control circuit 21d creates a series of image information for changing a screen layout showing that the reel periphery image 25e1 shown in the lower half region of the above game display 1G is moved in the direction of arrow B to the upper half region of the game display 1G and conversely the baseball representation image 25e shown in the upper half region of the game display 1G is moved to the lower half region of the game display 1G, and outputs the image information to the liquid crystal display panel 25. And, the liquid crystal display panel 25 shows images of changing the screen layout of the above series of reel periphery image 25e1 and the representation image 25e (see FIG. 12(b)).

(Step 14)

The CPU 21 produces image signals from the image data stored in the external storage device gm to make the pitcher pi wind up to start the pitching motion as the representation image 25e in the upper half region of the game display 1G as shown in FIG. 12(b) in combination with the start of spinning of the image reel 26a in the direction of arrow ay1, the image reel 26b1 in the direction of arrow by1 and the image reel 26c in the direction of arrow cy1 as the reel periphery image 25e1 in the lower half region of the game display 1G, and outputs the image signals to the image control circuit 21d.

Subsequently, the CPU 21a produces image signals to show a series of processes as the reel periphery image 25e1 in the lower half region of the game display 1G that the pitcher pi starts to pitch and winds up to throw a ball to the batter bt in combination with a series of processes that the image reels 26a, 26b, 26c spin for a prescribed time, the image reel 26a stops first, the image reel 26c stops spinning, and the middle image reel 26b only is spinning, and outputs the image signals to the image control circuit 21d.

(Step 15)

The image control circuit 21d successively creates from the image signals being input with a lapse of time a series of image information to show a process that the pitcher pi starts a windup and throws a ball to the batter bt as the representation image 25e in combination with a process as the reel periphery image 25e1 in the lower half region of the game display 1G that when the image reels 26a, 26b, 26c start to spin, the pitcher pi winds up to throw as the representation image 25e in the upper half region of the game display 1G at the same time, then, the image reels 26a, 26b, 26c spin for a prescribed time, the image reel 26a and the image reel 26c stop spinning in this order, and the middle image reel 26b only spins. In other words, it creates the image information to show a process that the image reels 26a, 26b, 26c start to spin at the same time when the pitcher pi starts to wind up to throw a ball, and the image reels 26a, 26b, 26c spin for a prescribed time in combination with the pitching motion of the pitcher pi to the batter bt, then, the image reels 26a and the image reel 26c stop spinning in this order and the middle image reel 26b only is spinning, and outputs the image information to the liquid crystal display panel 25. And, the liquid crystal display panel 25 shows the aforementioned series of images successively.

(Step 16)

Figure 12C:
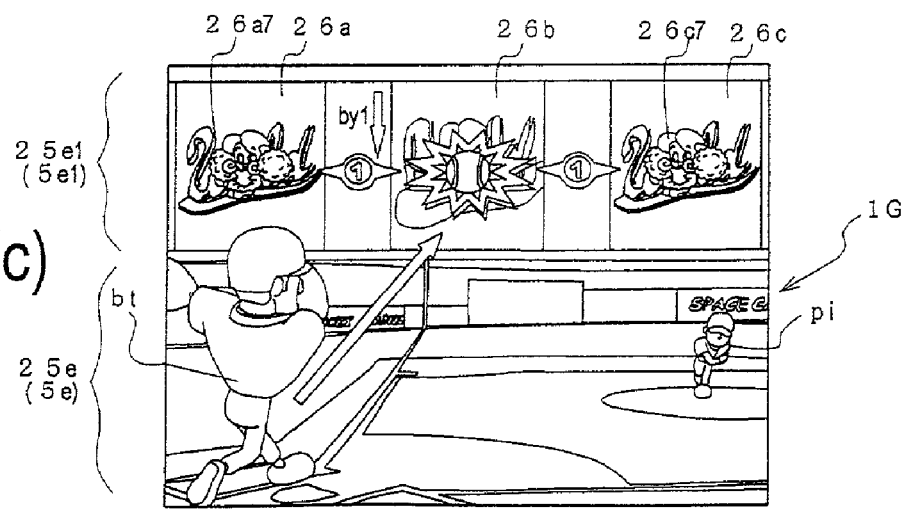

The CPU 21a produces image signals from the image data stored in the external storage device gm to show a process as the representation image 25e in the lower half region of the game display 1G as shown in FIG. 12(c) that the batter bt hits the ball thrown by the pitcher pi and the batted ball hits (fifth action) the image reel (the last spinning design reel of claim 9) 26b which is spinning in the direction of arrow by1, and at the same time, the spinning image reel 26b stops spinning to show the image design 26bn of the image reel 26b in the reel periphery image 25e1 in the upper half region of the game display 1G, and outputs the image signals to the image control circuit 21d.

(Step 17)

The image control circuit 21d successively creates from the image signals being input with a lapse of time a series of image information about a process that when the batter bt hits the ball thrown by the pitcher pi and the batted ball hits the image reel 26b which is spinning in the direction of arrow by1 in the representation image 25e in the lower half region of the game display 1G, the spinning image reel 26b in the reel periphery image 25e1 stops spinning to show the image design 26bn at the same time, and outputs the image information to the liquid crystal display panel 25. And, the liquid crystal display panel 25 shows the aforementioned series of images successively (see FIG. 12(c)).

What is described above is the baseball game display control using the slot game machine 20.

The above baseball game display can also be made by showing virtual images and images by the liquid crystal display panel 5 in the slot game machine 1.

As described above, the above display control is made by the CPU 10a which executes the control program stored in the EPROM 10b.

When the game is started, the game display 1G which is visually recognized by the player p through the protection glass 1g of the slot game machine 1 shows images that the pitcher pi is in set position and the batter bt is ready in the batter's box on the liquid crystal display panel 5 as the representation image 5e in the upper half region of the game display 1G as shown in FIG. 11 (a).

And, the designs 6an, . . . , the designs 6bn, . . . , and the designs 6cn, . . . on the peripheries of the mechanical reels 6a, 6b, 6c are illuminated and conspicuously shown by the reel lamp I (6a1), the reel lamp II (6b1) and the reel lamp III (6c1) and reflected by the half mirror 1m to show virtual images 6an', . . . , virtual images 6bn', . . . , and virtual image 6cn' in the lower half region of the game display 1G.

The CPU 10a of the slot game machine 1 controls drive signals to the stepping motor M1, the stepping motor M2 and the stepping motor M3 for driving the mechanical reels 6a, 6b, 6c in combination with image signals for showing images on the liquid crystal display panel 5, so that the same game display 1G as the display control in (step 1) to (step 12) of the aforementioned slot game machine 20 can be made as shown in FIGS. 11(b), (c).

And, to change the screen layouts in (step 12) and (step 13), the reel lamp I (6a1), the reel lamp II (6b1) and the reel lamp III (6c1) of the mechanical reels 6a, 6b, 6c in the slot game machine 1 are turned off not to show the virtual image 6a7', the virtual 6b7' and the virtual image 6c7', and in synchronization with the above process, the reel periphery image 5e1 having the same image designs 26a7, 26b7, 26c7 as the virtual images 26a7, 26b7, 26c7 is shown on the liquid crystal display panel 5 so that it is visually recognized by the player p in the same position as shown in FIG. 12(a), and the game display 1G is entirely shown by changing from the virtual image display mode to the real image display mode.

The subsequent display control is made by controlling in the same way as in the (step 12) to (step 17).

In the above embodiment, it is configured to have representation that when the bonus game is realized, the representation image 25e shown in the upper portion of the game display 1G is moved downward, and the reel periphery image 25e1 shown in the lower portion of the game display 1G is moved upward. But, the reel periphery image 25e1 may be moved to the right side of the game display 1G and the representation image 25e may be moved to the left side of the game display 1G. Otherwise, a game other than the baseball game may be performed, the representation image 25e may be moved to the bottom left of the game display 1G, and the reel periphery image 25e1 may be moved to the upper right of the game display 1G. And, the moving positions of the reel periphery image 25e1 and the representation image 25e are selected in various ways and designed to have representation as desired depending on the contents of the game.

The baseball game is shown in the above example, but it is to be understood that games and sports such as soccer, basket, handball, shooting and the like other than the baseball game may be applied.

In the bonus game described above, it is configured that the last spinning design reel is stopped by the ball hit by the batter, but it may be stopped by the ball shot by a player of the soccer game, by the ball shot by a player of the handball game or by shooting. Thus, a variety of representation can be made other than the batted ball of the baseball.

By configuring as described above, in the baseball game, the pitcher of the representation image starts to throw in combination with the start of spinning of the design reels, the pitcher throws a ball in combination with the spinning of the design reels for a prescribed time, and the batter swings at the same time when the last spinning design reel stops to determine the result of the slot game.

And, when a winning hand is not realized, the batter swings but misses the ball thrown by the pitcher, but when a winning hand is realized, the batter gets a hit, and the gained prize money of the realized winning hand is shown.

Therefore, the character of the representation image is represented in compliance with the start or stop of spinning of the design reels to add the representation effects to the operation of the design reels, so that new interest can be added to the slot game, and a gambling spirit is stimulated.

Because the prize money for the realized winning hand is shown together with a mark of the realized winning hand, the player can know the gained prize money without moving the viewpoint, and the pleasure with the realized winning hand is elevated.

When the bonus game is realized, the design reels are moved to the upper portion of the game display and the representation image between the pitcher and the batter of the baseball is moved to the lower portion of the game display.

Therefore, the design reels are positioned in the upper portion of the game display and the representation image of the baseball between the pitcher and the batter is positioned in the lower portion of the game display, so that new representation becomes possible that the batter hits up a ball thrown by the pitcher and the batted ball hits against the last spinning image reel to stop it.

Thus, new interest linked with the baseball is added to the bonus game, a gambling spirit is stimulated, and the pleasure of the game is doubled.

Therefore, a slot game which is rich in game property with new interest added can be realized by the representation effects of the representation images by the baseball.

Then, the display control of the chicken game according to the second embodiment will be described.

The display control of the chicken game to be performed by showing the virtual images and the images by means of the slot game machine 1 will be described with reference to FIG. 13.

As described above, the display control is performed by executing the control program stored in the EPROM 10b by the CPU 10a.

Figure 14A:
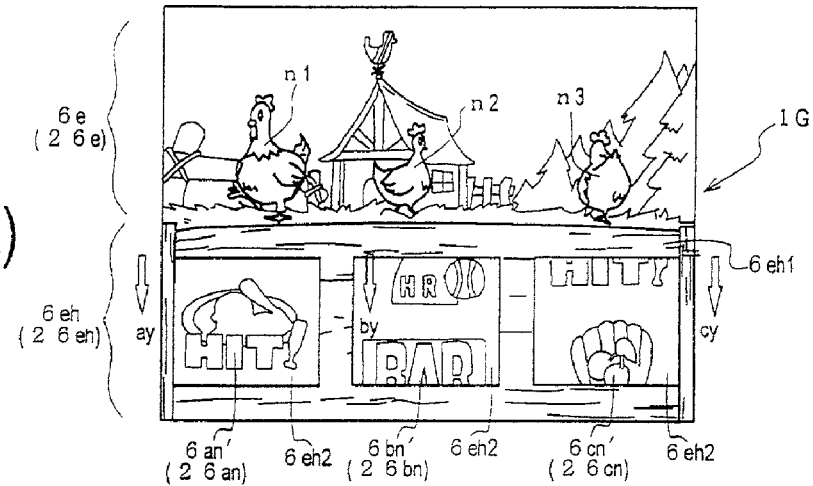
FIGS. 14(a), 14(b) and 14(c) are a diagram showing a game display at the start of spinning of the design reels of the chicken game of the second embodiment according to the invention, a diagram showing a game display when the design reels are stopped, and a diagram showing a game display when a winning hand is realized.

When the game is started, the game display 1G which is visually recognized by the player p through the protection glass 1g of the slot game machine 1 has images of three chickens (characters of claim 10) n1, n2, n3 walking around in a pastoral scenery displayed as the representation image (representation display section) 6e in the upper half region of the game display 1G as shown in FIG. 14(a) by the liquid crystal display panel 5.

At this time, the CPU 10a produces image signals from the image data stored in the external storage device gm to show representation image 6e showing that the chickens n1, n2, n3 are walking around in the pastoral scenery, and reel background image (main display section) 6eh having a wood wall 6eh1 and design background sections 6eh2, 6eh2, 6eh2, and outputs the image signals to the image control circuit 10d.

When the image signals are input, the image control circuit 10d creates image information about the image signals and outputs to the liquid crystal display panel 5, and the liquid crystal display panel 5 shows the game images of the representation image 6e and the reel background image 6eh.

And, as the reel background image 6eh in the lower half region of the game display 1G, the wood wall 6eh1 and the three dark-colored design background sections 6eh2, 6eh2, 6eh2 are shown by the liquid crystal display panel 5, the designs 6an, . . . , the designs 6bn, . . . , and the designs 6cn, . . . which are on the peripheries of the mechanical reels 6a, 6b, 6c are illuminated and conspicuously shown by the reel lamp I (6a1), the reel lamp II (6b1) and the reel lamp III (6c1), and the victual image 6an', the virtual image 6bn' and the virtual image 6cn' reflected by the half mirror are shown in the design background sections 6eh2, 6eh2, 6eh2 (See FIG. 4).

Figure 13:
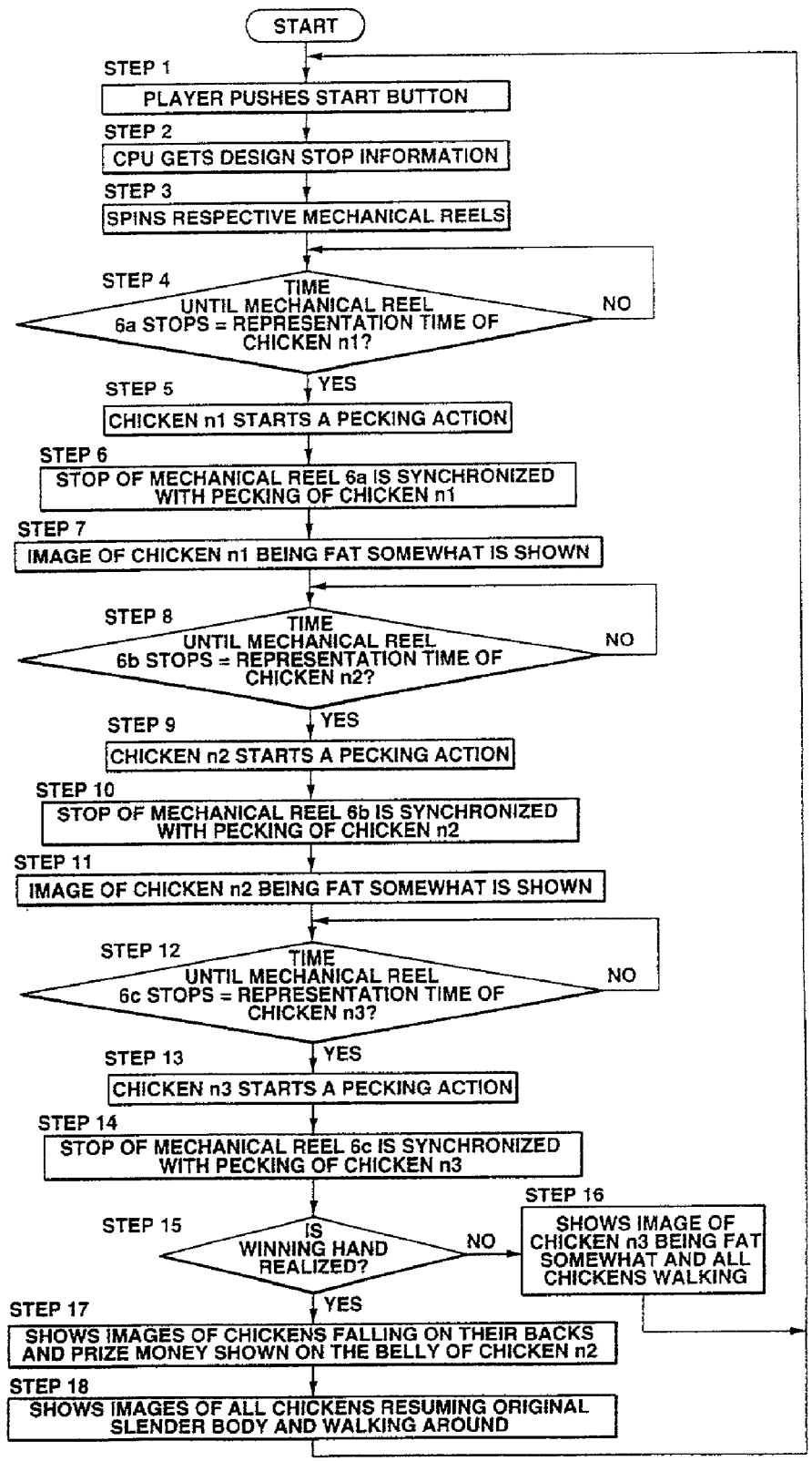
FIG. 13 is a flow chart of a display control process when a chicken game of a second embodiment of the invention is played on the slot game machine which can display virtual images and images.

For the following, FIG. 13 shall be referred to.

(Step 1)

When the player p depresses the maximum bet/start button 3m or the play button 3s, a start signal is input from a start button switch (not shown) to the CPU 10a through the interface 1e.

(Step 2)

When the start signal is input, the CPU 10a performs the inside lottery, namely, generates random numbers by the random number generator, to obtain information about which of the virtual images 6an', 6bn', 6cn' of the designs 6an, 6bn, 6cn of the mechanical reels 6a, 6b, 6c is shown and stopped.

(Step 3)

The CPU 10a outputs drive control signals to the stepping motor M1, the stepping motor M2 and the stepping motor M3 through the interface 11a to spin the mechanical reels 6a, 6b, 6c in such a way that the virtual image 6an' of the design 6an spins in direction ay, the virtual image 6bn' of the design 6bn spins in direction by, and the virtual image 6cn' of the design 6cn spins in direction cy as shown in FIG. 14(a).

(Step 4)

The CPU 10a obtains information from a timer (not shown) about whether the mechanical reels 6a, 6b, 6c have spun for a prescribed time, and judges whether a time before stopping the mechanical reel 6a and a time of providing the representation of the chicken n1, namely a time of performing a pecking action (prescribed action of claim 10) of the chicken n1 against the virtual image 6an' of the design 6an of the mechanical reel 6a have become equal.

Here, a series of images showing the pecking action of the chicken n1 is previously created and stored in the external storage device gm so that it is performed in a prescribed time.

(Step 5)

Figure 14B:
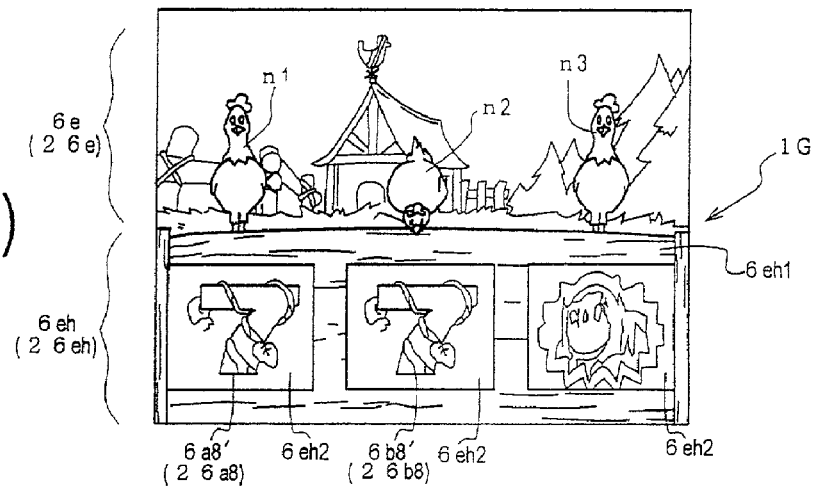

When the time before stopping the mechanical reel 6a and the time of providing the representation of the chicken n1 become equal, the CPU 10a produces image signals from the image data stored in the external storage device gm to show representation image 6e showing that the chicken n1 starts pecking like the chicken n2 in a pastoral scenery shown in FIG. 14(b) and other chickens n2, n3 are walking around, and the reel background image 6eh having the wood wall 6eh1 and the design background sections 6eh2, 6eh2, 6eh2, and outputs the image signals to the image control circuit 10d.

When the image signals are input, the image control circuit 10d creates image information according to the image signals and outputs to the liquid crystal display panel 5, and the liquid crystal display panel 5 shows the game images of the representation image 6e and the reel background image 6eh.

(Step 6)

After receiving information from the timer about that it is time to stop the mechanical reel 6a, the CPU 10a outputs a drive stop signal to the stepping motor M1 through the interface 11a to stop the mechanical reel 6a.

At this time, the action that the chicken n1 shown in the representation image 6e pecks at the virtual image 6an' of the design 6an of the mechanical reel 6a and timing to stop the movement of the virtual image 6an' of the design 6an because the mechanical reel 6a stops are synchronized, so that the player p visually recognizes as if the movement of the virtual image 6a8' of the design 6a8 is stopped by the pecking chicken n1.

(Step 7)

The CPU 10a produces image signals from the image data stored in the external storage device gm to show images of the chicken n1 as if it has become fat somewhat (character display mode) after pecking at food as shown in FIGS. 15(*a*) to 15(*c*) and outputs the image signals to the image control circuit 10*d*.

When the image signals are input, the image control circuit 10*d* creates image information according to the input image signals and outputs the image information to the liquid crystal display panel 5, which then shows the images.

(Step 8)

The CPU 10*a* judges from a timer (not shown) whether the time before the mechanical reel 6*b* is stopped and the time to make the representation of the chicken n2, namely the time of performing a pecking action of the chicken n2 against the virtual image 6*bn*' of the design 6*bn* of the mechanical reel 6*b* have become equal.

Here, a series of images showing the pecking action of the chicken n2 is previously created and stored as images in the external storage device gm so that it is performed in a prescribed time.

(Step 9)

When the time before stopping the mechanical reel 6*b* and the time of performing the representation of the chicken n2 become equal, the CPU 10*a* produces image signals from the image data stored in the external storage device gm to show representation image 6*e* showing that the chicken n2 starts pecking in a pastoral scenery and other chickens n1, n3 are standing as shown in FIG. 14(*b*), and the reel background image 6*eh* having the wood wall 6*eh*1 and the design background sections 6*eh*2, 6*eh*2, 6*eh*2, and outputs the image signals to the image control circuit 10*d*.

When the image signals are input, the image control circuit 10*d* creates image information according to the input image signals and outputs to the liquid crystal display panel 5, and the liquid crystal display panel 5 shows game images of the representation image 6*e* and the reel background image 6*eh*.

(Step 10)

After receiving information from the timer about that it is time to stop the mechanical reel 6*b*, the CPU 10*a* outputs a drive stop signal to the stepping motor M2 through the interface 11*a* to stop the mechanical reel 6*b*.

At this time, the action that the chicken n2 shown in the representation image 6*e* pecks at the virtual image 6*bn*' of the design 6*bn* of the mechanical reel 6*b* as shown in FIG. 14(*b*) is synchronized with timing to stop the movement of the virtual image 6*bn*' of the design 6*bn* because the mechanical reel 6*b* stops, so that the player p visually recognizes as if the movement of the virtual image 6*b*8' of the design 6*b*8 is stopped by the pecking chicken n2.

(Step 11)

The CPU 10*a* produces image signals from the image data stored in the external storage device gm to show images of the chicken n2 as if it has become fat somewhat after pecking at food as shown in FIGS. 15(*a*) to 15(*c*) and outputs the image signals to the image control circuit 10*d*.

When the image signals are input, the image control circuit 10*d* creates image information according to the input image signals and outputs to the liquid crystal display panel 5, which then shows the images.

(Step 12)

The CPU 10*a* judges according to a timer (not shown) whether the time before the mechanical reel 6*c* is stopped has become equal to the time to make the representation of the chicken n3, namely the time of performing a pecking action of the chicken n3 against the virtual image 6*cn*' of the design 6*cn* of the mechanical reel 6*c*.

At this time, the mechanical reel 6*c* is spinning and the virtual image 6*cn*' of the design 6*cn* is moving as shown in FIG. 14(*b*).

Here, a series of images showing the pecking action of the chicken n3 is previously created and stored as images in the external storage device gm so that it is performed in a prescribed time.

(Step 13)

When the time before stopping the mechanical reel 6*c* and the time of performing the representation of the chicken n3 become equal, the CPU 10*a* produces image signals from the image data stored in the external storage device gm to show representation image 6*e* showing that the chicken n3 starts pecking like the chicken n2 in a pastoral scenery and other chickens n1, n3 are standing as shown in FIG. 14(*b*), and the reel background image 6*eh* having the wood wall 6*eh*1 and the design background sections 6*eh*2, 6*eh*2, 6*eh*2, and outputs the image signals to the image control circuit 10*d*.

When the image signals are input, the image control circuit 10*d* creates image information according to the input image signals and outputs to the liquid crystal display panel 5, and the liquid crystal display panel 5 shows game images of the representation image 6*e* and the reel background image 6*eh*.

(Step 14)

After receiving information from the timer about that it is time to stop the mechanical reel 6*c*, the CPU 10*a* outputs a drive stop signal to the stepping motor M3 through the interface 11*a* to stop the mechanical reel 6*c*.

At this time, the action that the chicken n3 shown in the representation image 6*e* pecks at the virtual image 6*cn*' of the design 6*cn* of the mechanical reel 6*c* is synchronized with the timing to stop the movement of the virtual image 6*cn*' of the design 6*cn* because the mechanical reel 6*c* stops, so that the player p visually recognizes as if the movement of the virtual image 6*cn*' of the design 6*cn* is stopped by the pecking chicken n3.

(Step 15)

The CPU 10*a* obtains inside lottery work data stored in the storage area of the RAM 10*c* which shows the inside lottery result, and judges whether a winning hand, which has a combination of the virtual images 6*an*', 6*bn*', 6*cn*' formed to conform to a prescribed row of designs, is realized.

(Step 16)

If a winning hand is not realized, the CPU 21*a* produces image signals from the image data stored in the external storage device gm to show the representation image 6*e* that the chicken n1 has become fat somewhat after pecking as shown in FIGS. 15(*a*) to 15(*c*) and the chickens n2 and n3 are walking around and the reel background image 6*eh* having the wood wall 6*eh*1 and the design background sections 6*eh*2, 6*eh*2, 6*eh*2, and outputs the image signals to the image control circuit 10*d*.

When the image signals are input, the image control circuit 10*d* creates image information according to the input image signals and outputs to the liquid crystal display panel 5, which then shows the images (see FIG. 14(*a*)).

(Step 17)

When a winning hand is realized, the CPU 21*a* reads inside lottery work data showing the inside lottery result from the storage area of the RAM 10*c* and obtains data on prize money presented to the player according to the realized winning hand from the winning hand realization image design set table.

Figure 14C:
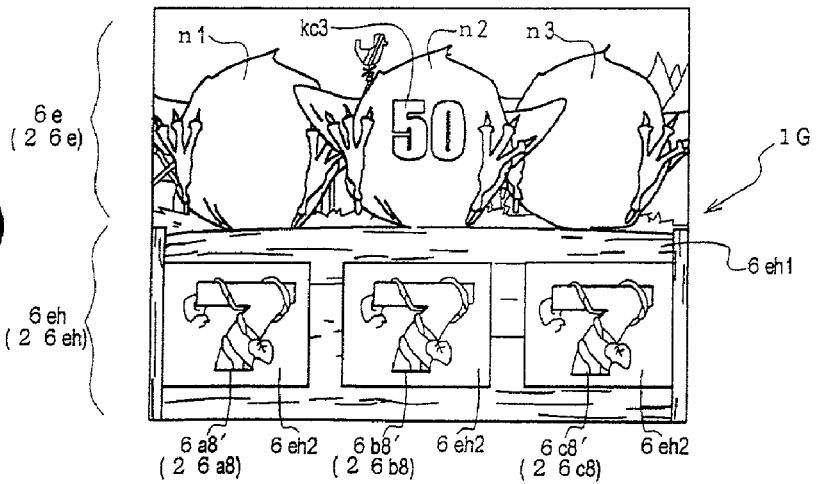

Subsequently, as shown in FIG. 14(c), the CPU 21a produces image signals to show representation image 6e that the chicken n1, the chicken n2 and the chicken n3 fall on their backs (sixth action) and prize money (gained payoff) kc3 is shown on the belly of the chicken n2 and the reel background image 6eh having the wood wall 6eh1 and the design background sections 6eh2, 6eh2, 6eh2, and outputs the image signals to the image control circuit 10d.

When the image signals are input, the image control circuit 10d creates image information according to the input image signals and outputs to the liquid crystal display panel 5, which then shows game images of the representation image 6e showing the prize money kc3 on the belly of the chicken n2 and the reel background image 6eh.

Thus, when the virtual image 6a8' of the design 6a8, the virtual image 6b8' of the design 6b8 and the virtual image 6c8' of the design 6c8 are matched to realize a winning hand, the chickens n1, n2, n3 fall on their backs immediately and the prize money kc3 is shown on the belly of the chicken n2, so that the player p can have his/her joy of the realized winning hand doubled by the game display and also can know the amount of prize money for the realized winning hand.

(Step 18)

The CPU 21a produces image signals from the image data stored in the external storage device gm to show the representation images 6e showing that the chickens n1, n2, n3 which have resumed the original slender body shown in FIG. 15(a) are walking around and the reel background images 6eh having the wood wall 6eh1 and the design background sections 6eh2, 6eh2, 6eh2, and outputs the image signals to the image control circuit 10d.

When the image signals are input, the image control circuit 10d creates image information according to the input image signals and outputs to the liquid crystal display panel 5, which shows the above images (see FIG. 14(a)).

What is described above is the display control of the chicken game using the slot game machine 1.

The above chicken game can also be played on the image display only of the liquid crystal display panel 25 of the slot game machine 20.

As described above, the display control is performed by executing the control program stored in the EPROM 21b by the CPU 21a.

In this case, the representation image 6e in the upper half region of the game display 1G becomes the representation image (representation display section) 26e which is shown by the liquid crystal display panel 25, the reel background image 6eh becomes the reel background image (main display section) 26eh which is shown by the liquid crystal display panel 25, and the virtual images 6an', 6bn', 6cn' of the designs 6an, 6bn, 6cn on the peripheries of the mechanical reels 6a, 6b, 6c become image designs 26an, 26bn, 26cn on the peripheries of the image reels which are shown by the liquid crystal display panel 25 (see FIG. 14(a)).

Here, the display control of the chicken game using the slot game machine 20 can be achieved by converting the control to the mechanical reels 6a, 6b, 6c into the control of the image designs 26an, 26bn, 26cn on the peripheries of the image reels and making substantially the same control as the display control of the slot game machine 1 shown in FIG. 13.

In the aforementioned chicken game, any one of the design reels is stopped by the pecking action of the respective chickens n1, n2, n3, but it is to be understood that the design reels to be stopped may be two or three, and the number of the design reels to be stopped may be determined as desired.

The chickens n1, n2, n3 are represented to become fat gradually by the pecking action, but they may be represented to become thin by making them act different from the pecking action or making them become small. Thus, their changing modes can be represented in various ways.

It is configured above that when a winning hand is realized, the chickens n1, n2, n3 fall on their backs and the prize money gained for the realized winning hand is shown on the belly of the chicken n2, but the gained prize money may be shown on a part of the body of the chicken n1, a part of the body of the chicken n3, or the whole of the representation images 6e, 26e. And, the representation of the display of the gained prize money can be shown in various ways in the representation images 6e, 26e.

It may be represented that when a winning hand is realized, the chickens n1, n2, n3 may jump up instead of falling on their backs, show a surprised expression, or show other various actions as desired.

Although the chickens are used as a character in the above embodiment, other various characters such as cats, dogs, lions, rabbits can be used as desired.

In the second embodiment, the chicken game was described as an example, but it is to be understood that a hunting game, a searching game, and other various games and stories may be used for representation.

According to the aforementioned configuration of the chicken game, the stop of spinning of the design reels and the pecking action of the chickens are performed in combination with each other, so that it is possible to make the stop of the design reels involving new representation that the spinning of the design reels is stopped by the pecking chickens.

Because the chickens become fat as they peck at food, the player can enjoy fun of the story while playing the slot game.

And, when a winning hand is realized, three chickens which have become fat after pecking at food fall on their backs, and prize money for the realized winning hand is shown on the body of one chicken, so that the player can visually check the prize money for the realized winning hand without moving the viewpoint. And, joy of the realized winning hand is elevated by the representation effect of the chickens.

After the winning hand is realized, the three fat chickens resume their thin bodies, and a new slot game is started. Therefore, when the winning hand is realized, the player can enjoy a single story while playing the slot game.

Thus, a slot game which has high game property with new interest added becomes possible owing to the representation effect of the representation images according to the actions of the chickens.

Therefore, there is realized a combined representation display method by which the main display section and the representation display section are mutually combined, the representation effect is enormous and rich in interest, and various combination displays can be made.

In the above embodiments, the slot game machine was described as an example, but it is to be understood that the combined representation display method of the present invention can be applied effectively to other game machines and electronic equipment having an image display, and the like.

What is claimed is:

1. A combined representation display method for a display screen having a main display section for showing a reflected virtual image and a representation display section for showing a real image transmitted from a background image, the method comprising:

displaying on the main display section a slot game which is shown on peripheries of a plurality of design reels having designs, displaying of the representation display section in combination with the operation of the design reels; and when a bonus game is realized, the real image of the background image, in which images of the plurality of design reel peripheries are arranged at same positions on the display screen where the virtual images of the plurality of design reel peripheries are shown, is shown on the main display section in synchronism with the non-display of the virtual image of the main display section, and thereafter, the image of the main display section and the image of the representation display section are mutually switched with one another.

* * * * *